United States Patent [19]
Shinkawa et al.

[11] Patent Number: 5,780,983
[45] Date of Patent: Jul. 14, 1998

[54] BRUSHLESS DC MOTOR DRIVE APPARATUS

[75] Inventors: Osamu Shinkawa; Akihito Uetake. both of Suwa. Japan

[73] Assignee: Seiko Epson Corporation. Tokyo, Japan

[21] Appl. No.: 623,347

[22] Filed: Mar. 27, 1996

[30] Foreign Application Priority Data

| Mar. 15, 1994 | [JP] | Japan | 6-44142 |
| Mar. 31, 1995 | [JP] | Japan | 7-076711 |
| Jan. 10, 1996 | [JP] | Japan | 8-002690 |

[51] Int. Cl.$^6$ .................................................. A02P 6/02
[52] U.S. Cl. .......................... 318/254; 318/138; 318/439
[58] Field of Search ............................... 318/254, 138, 318/439

[56] References Cited

U.S. PATENT DOCUMENTS

| 4,700,116 | 10/1987 | Inoue et al. | 318/254 X |
| 4,712,050 | 12/1987 | Nagasawa et al. | 318/138 X |
| 4,743,815 | 5/1988 | Gee et al. | 318/254 |
| 4,928,043 | 5/1990 | Plunkett | 318/254 |
| 5,367,234 | 11/1994 | DiTucci | 318/254 |
| 5,486,743 | 1/1996 | Nagai | 318/439 |
| 5,491,393 | 2/1996 | Uesugi | 318/439 |

OTHER PUBLICATIONS

"*Wide Speed Control of Interior Permanent Magnet Synchronous Motor*" Shigeo Morimoto, et al., IEE Japan, vol. 114–D, No. 6, 1994. (partial translation).

*Primary Examiner*—David S. Martin
*Attorney, Agent, or Firm*—Mark P. Watson

[57] ABSTRACT

A brushless DC motor drive apparatus according to the invention comprises a stator and a rotor, the stator including multi-phase armature windings which are connected in a star formation and generate a plurality of terminal voltages at respective terminals of the armature windings, and the rotor including a plurality of permanent magnets which form pairs of magnetic poles. The motor drive apparatus also includes an inverter coupled to the rotor for adjusting the speed of the rotor, a rotor position detection means for detecting the terminal voltages generated in the armature windings and for generating a position signal indicative of a magnetic pole position of the rotor. The rotor position detection means includes a line voltage generation means for generating line voltages corresponding to the terminal voltages of the armature windings and comparison means for comparing signals derived from the line voltages in predetermined combinations and outputting comparison signals as the positional signal. The motor drive apparatus also includes a drive control means for controlling and driving the inverter according to the position signal generated by the rotor position detection means, the drive control means including PWM (Pulse Width Modulation) chopper control means for generating a PWM chopper control signal to control the inverter. The motor drive apparatus according to the present invention can always detect accurate rotor position without being affected by the rotational frequency or load of the brushless DC motor. Furthermore, the motor drive apparatus can easily expand the operational range of a brushless DC motor, particularly that of a brushless DC motor possessing an embedded magnet-type rotor structure. Additionally, the motor drive apparatus can easily and accurately operate a brushless DC motor according to its motor characteristics and control method.

24 Claims, 26 Drawing Sheets

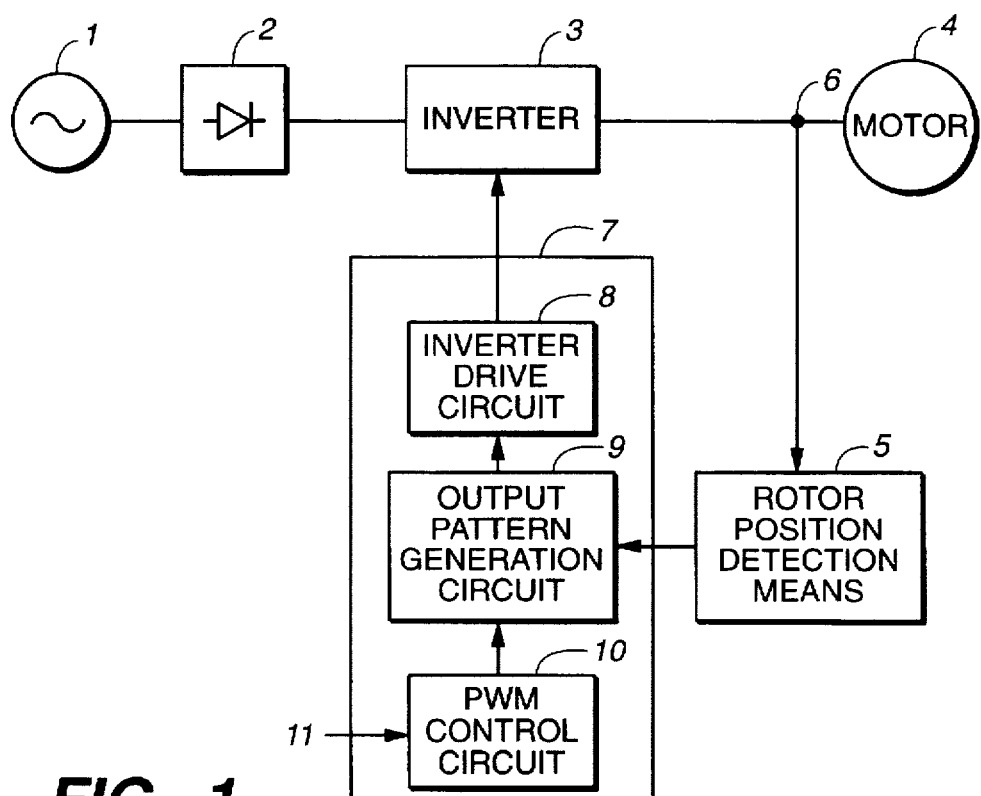
FIG._1
*(PRIOR ART)*
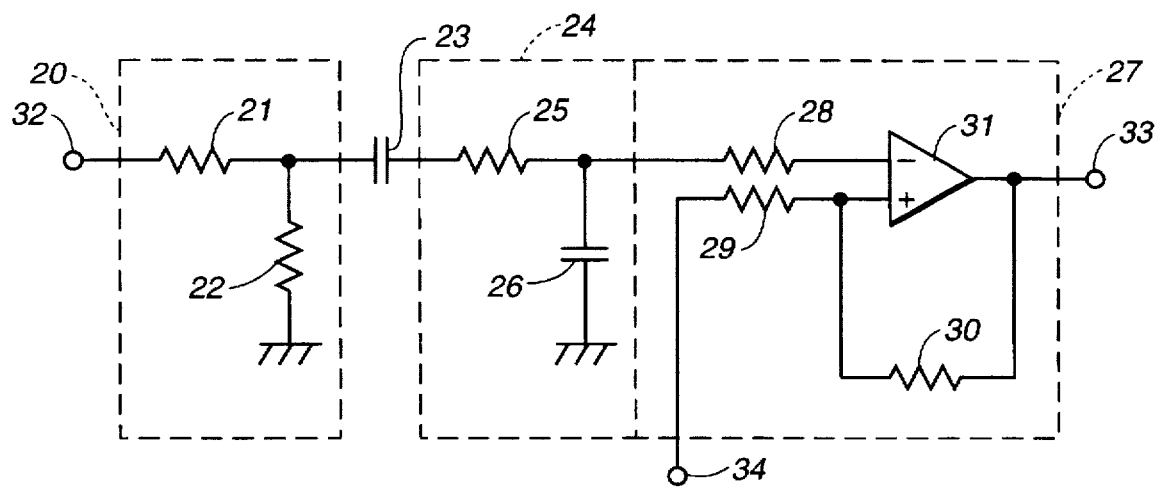
FIG._2
*(PRIOR ART)*

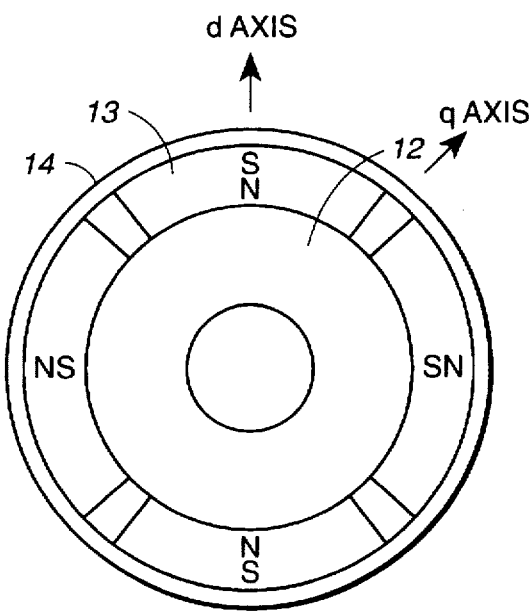
FIG._3
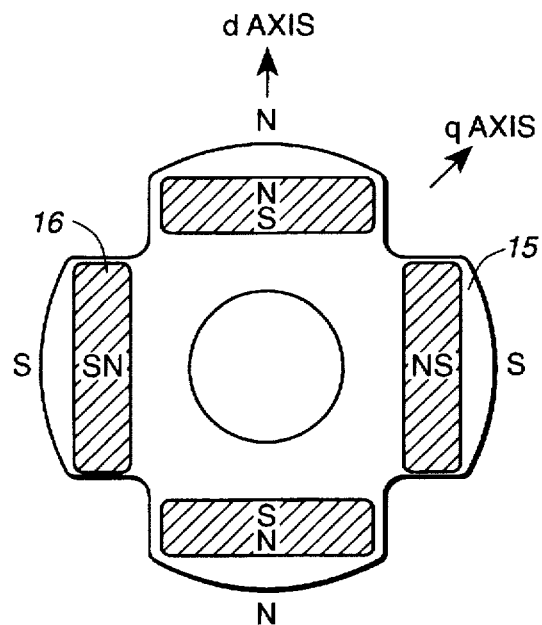
FIG._4
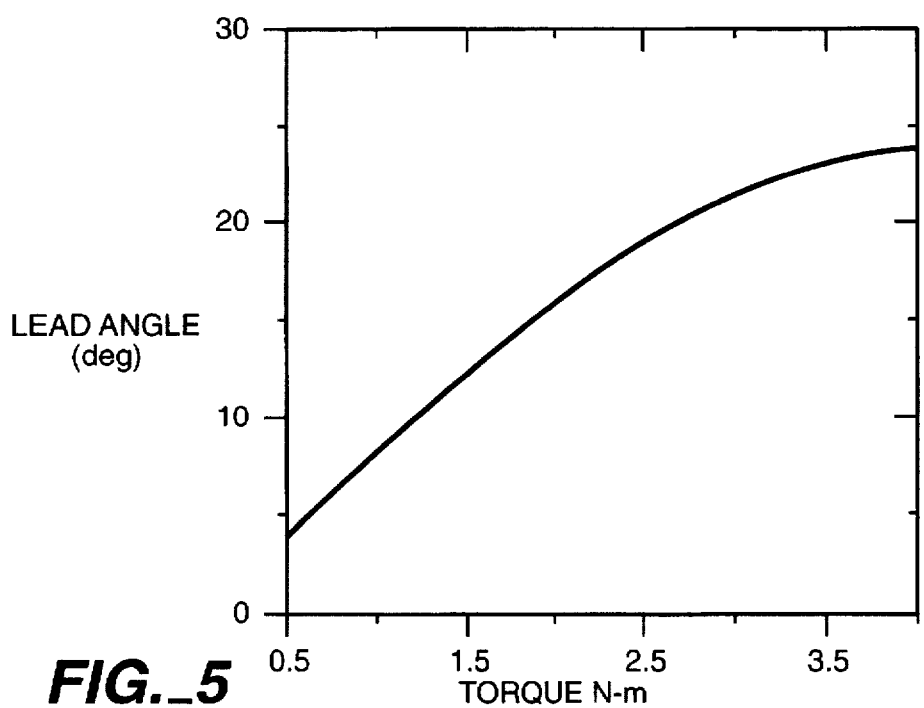
FIG._5

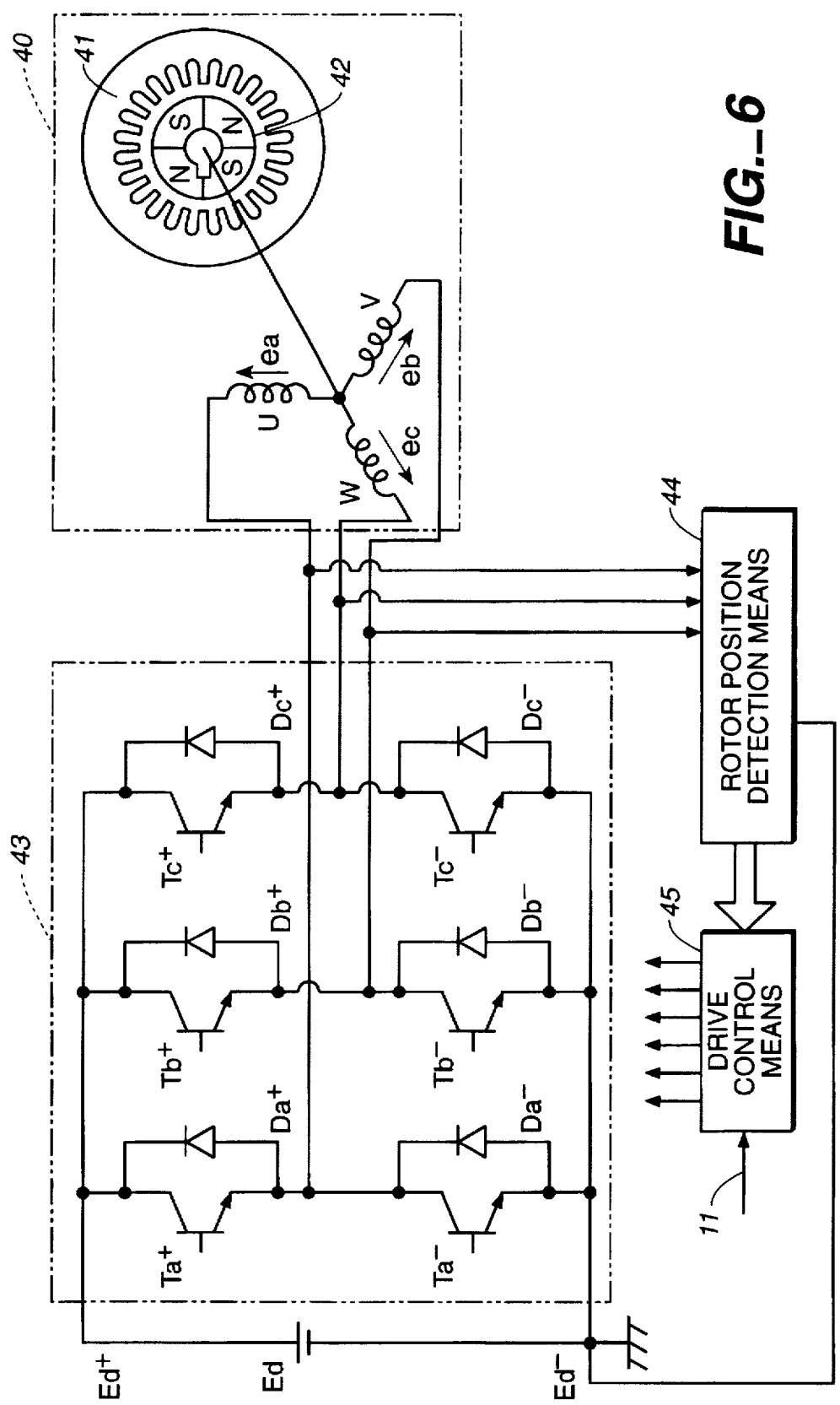
FIG._6

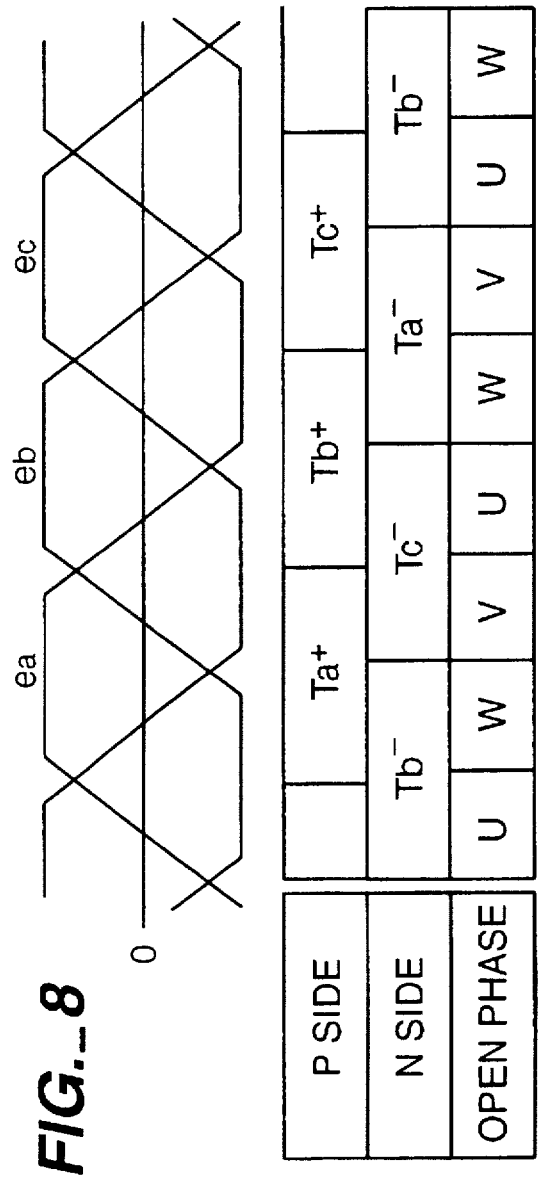
FIG._7
FIG._8

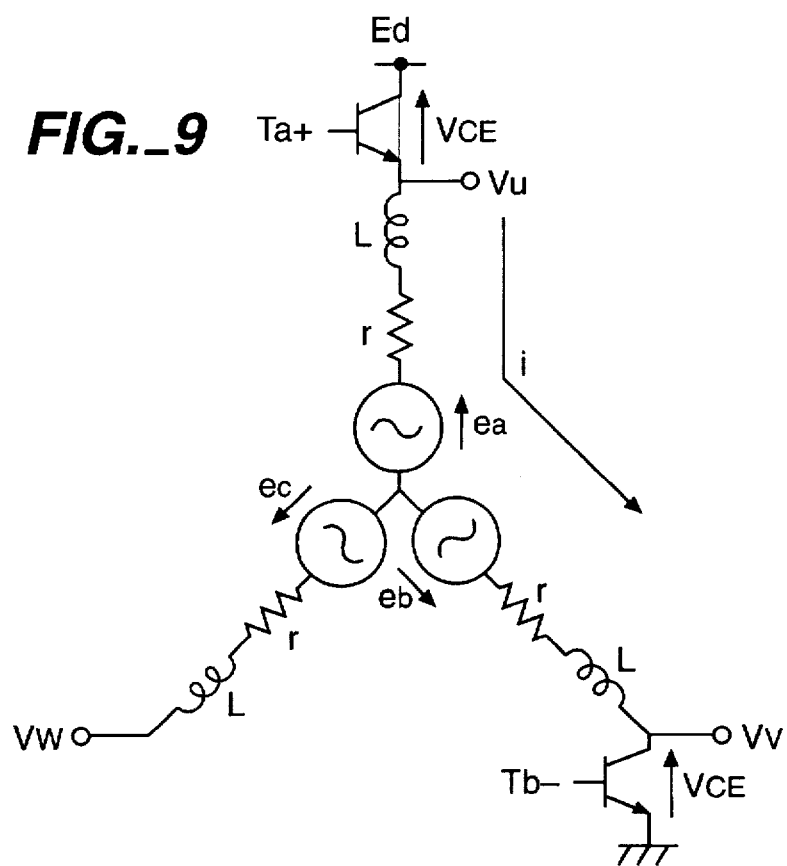
FIG._9
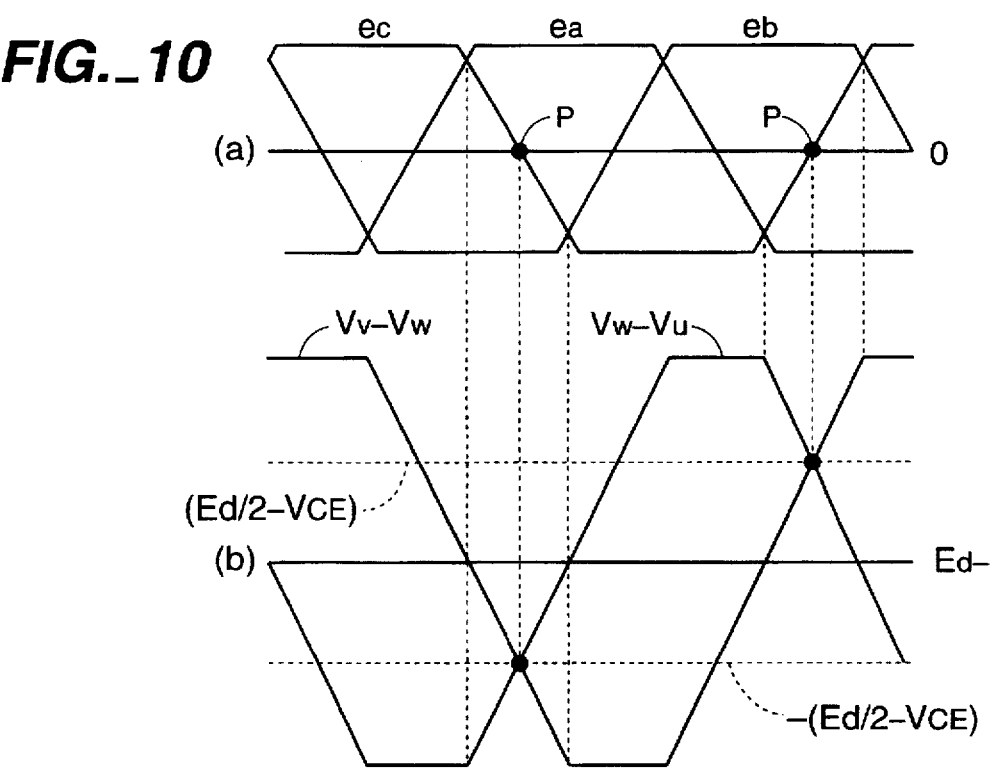
FIG._10

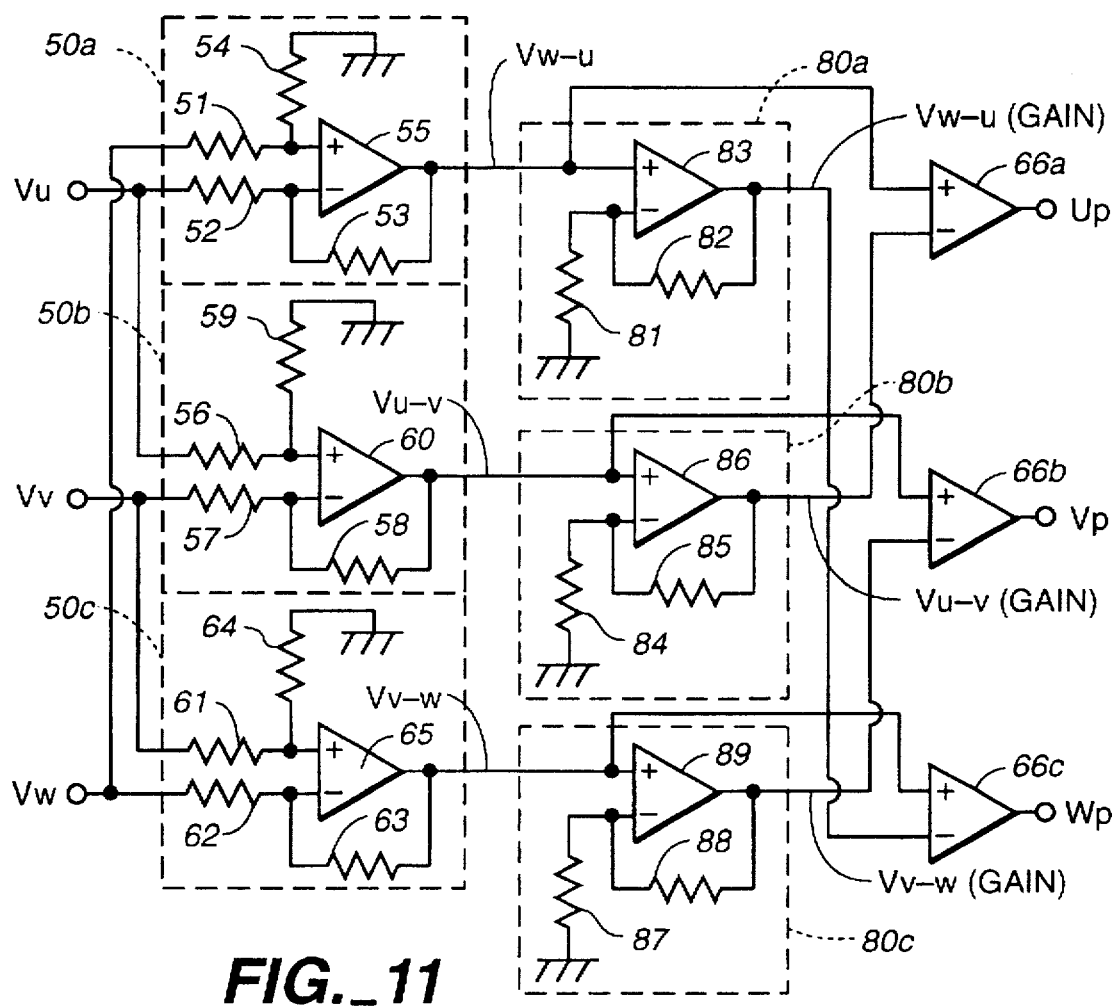
FIG._11
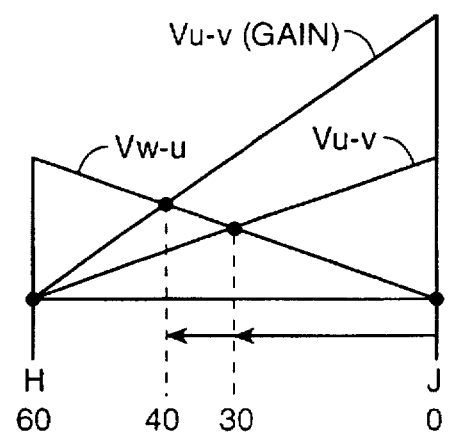
FIG._12

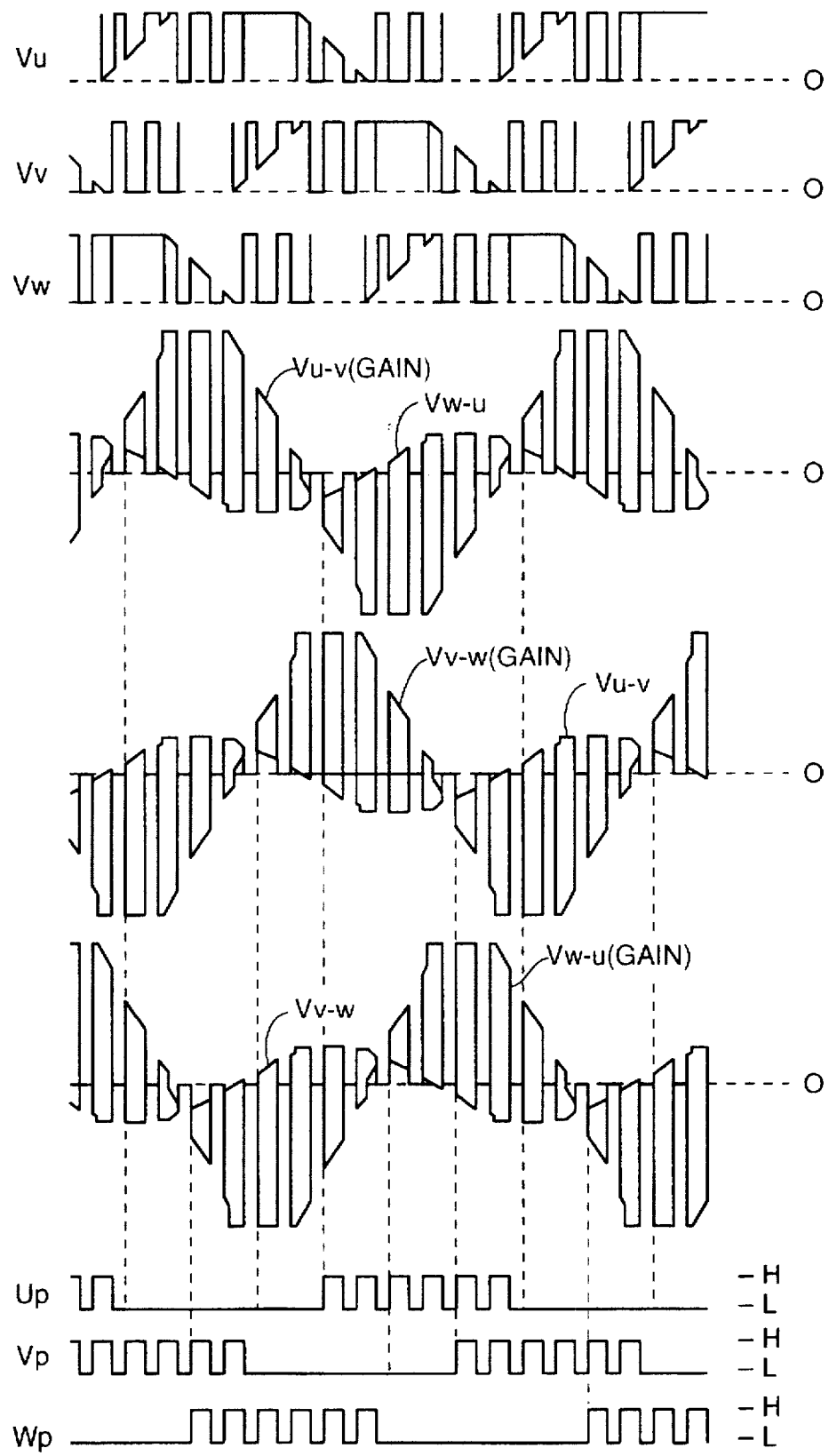
FIG._13

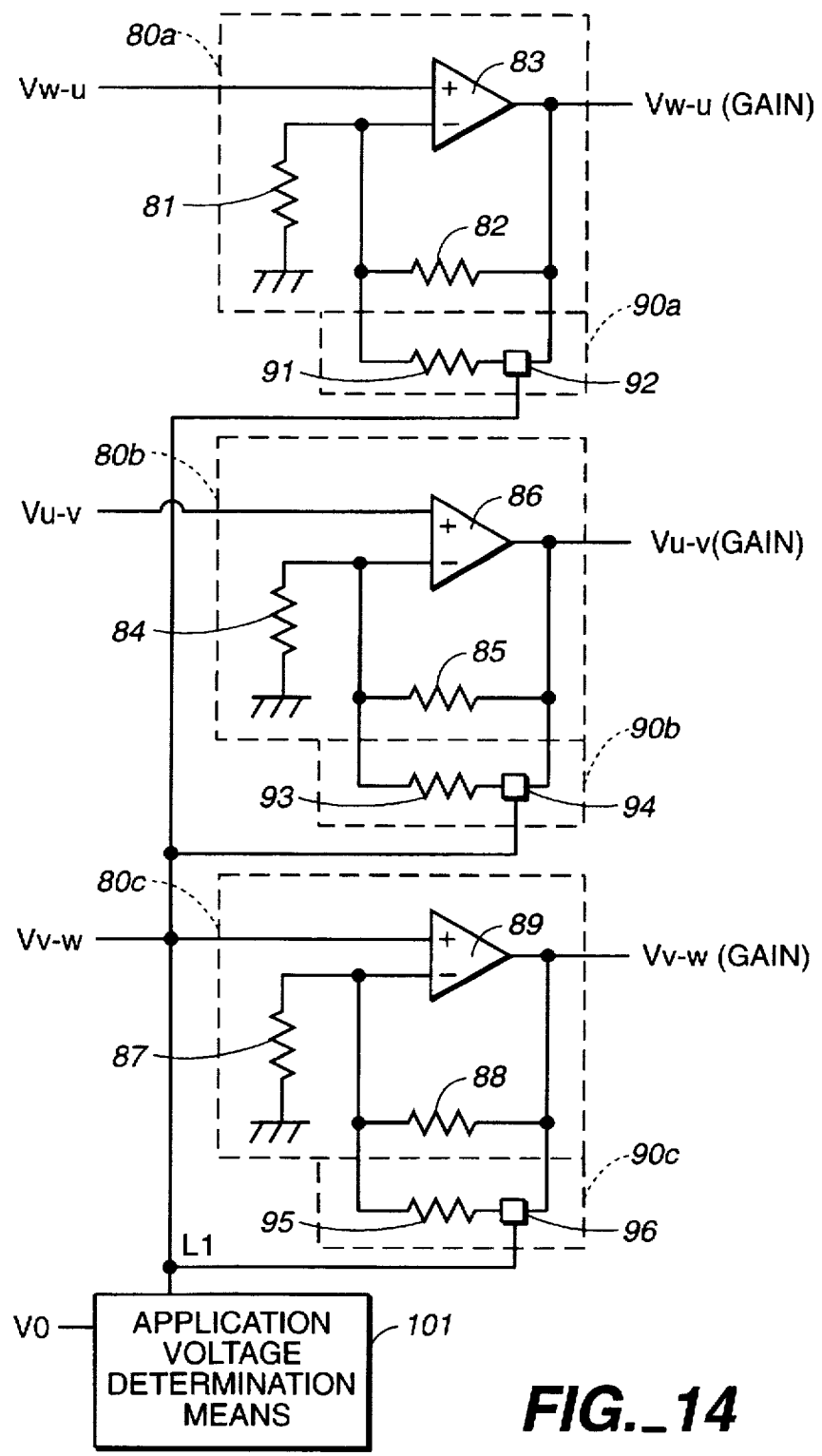
FIG._14

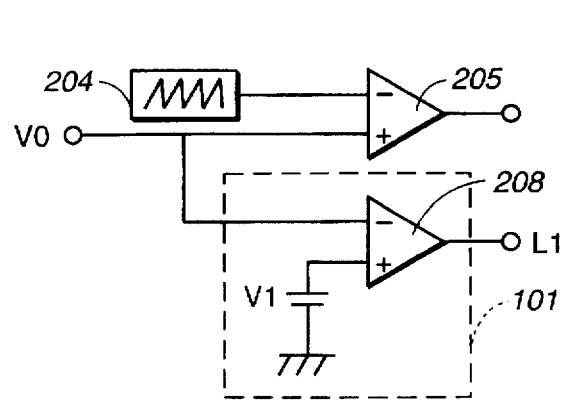
FIG._15
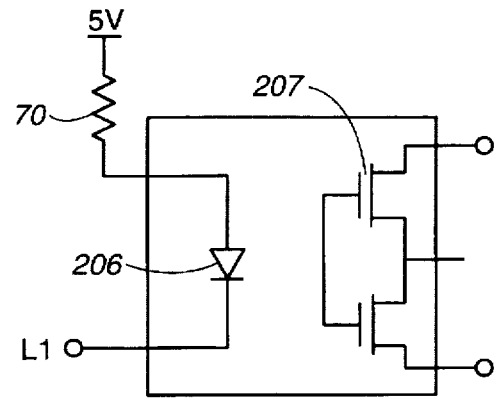
FIG._16
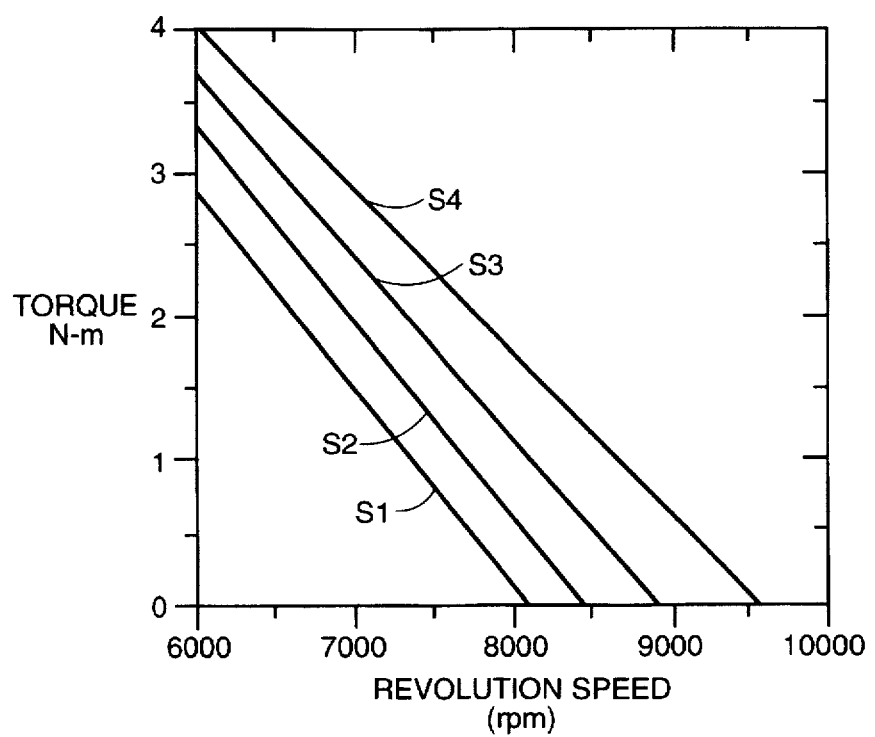
FIG._17

FIG._18
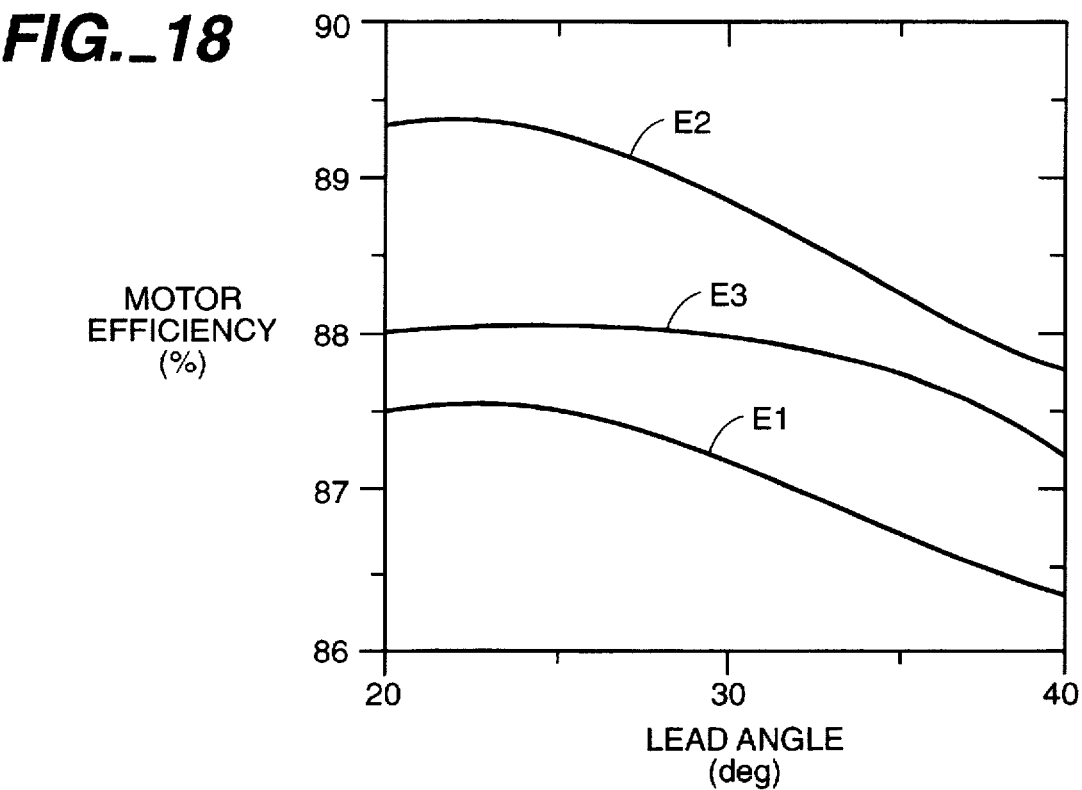
FIG._19
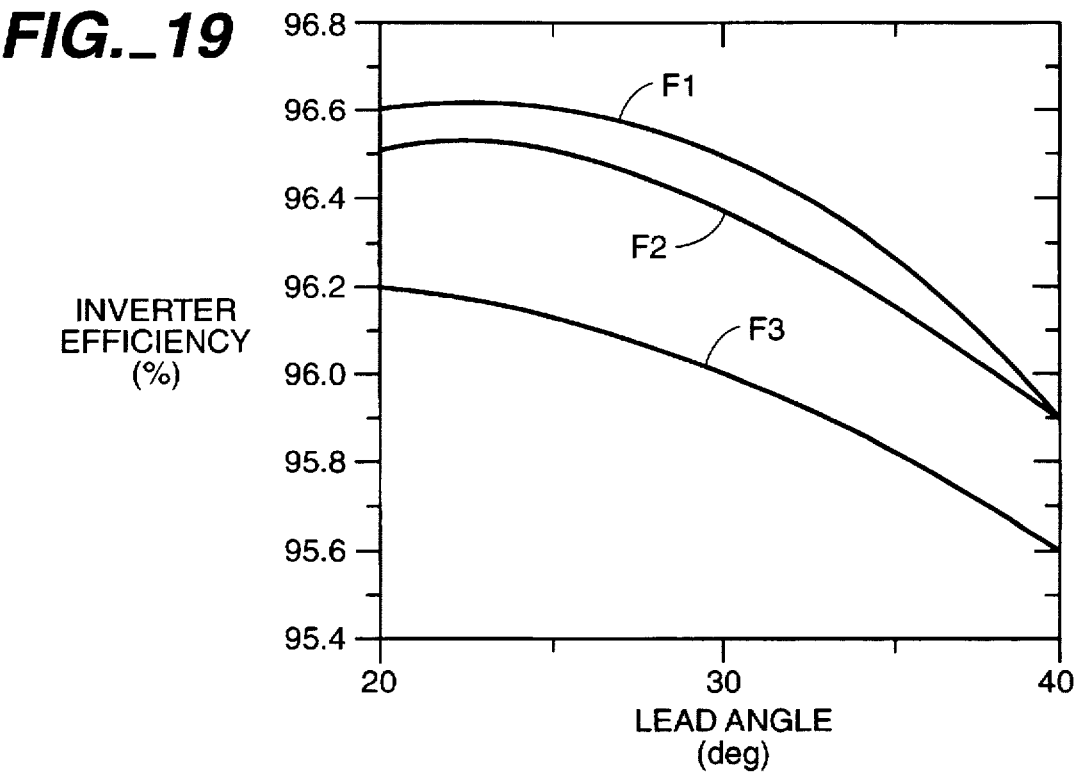

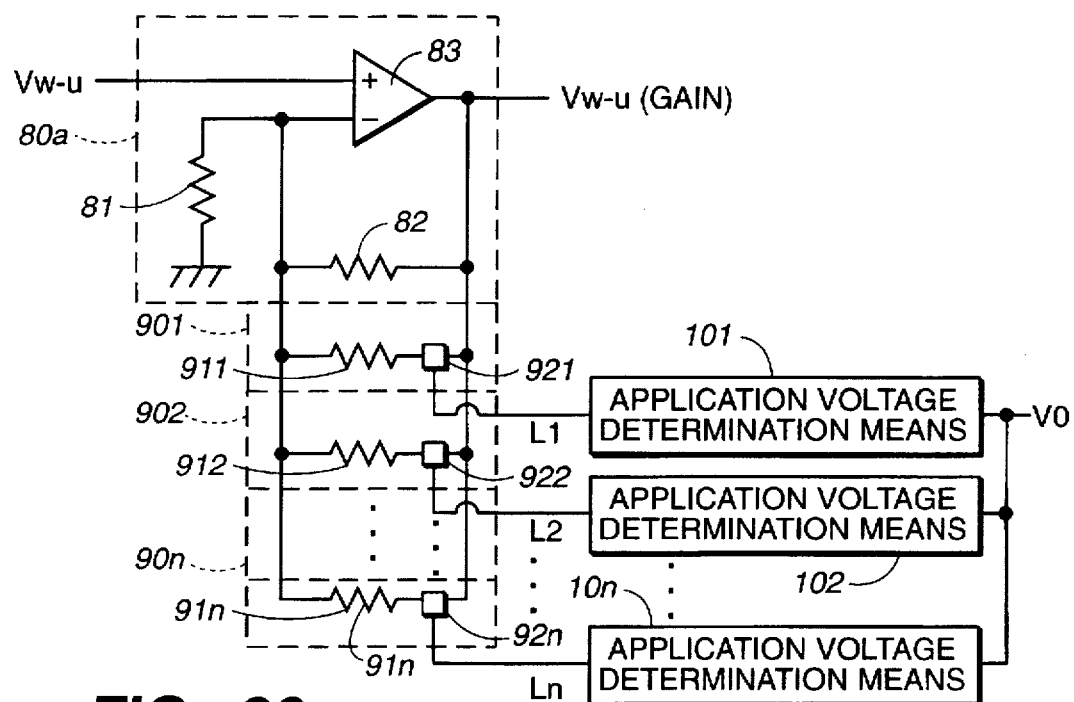
FIG._20
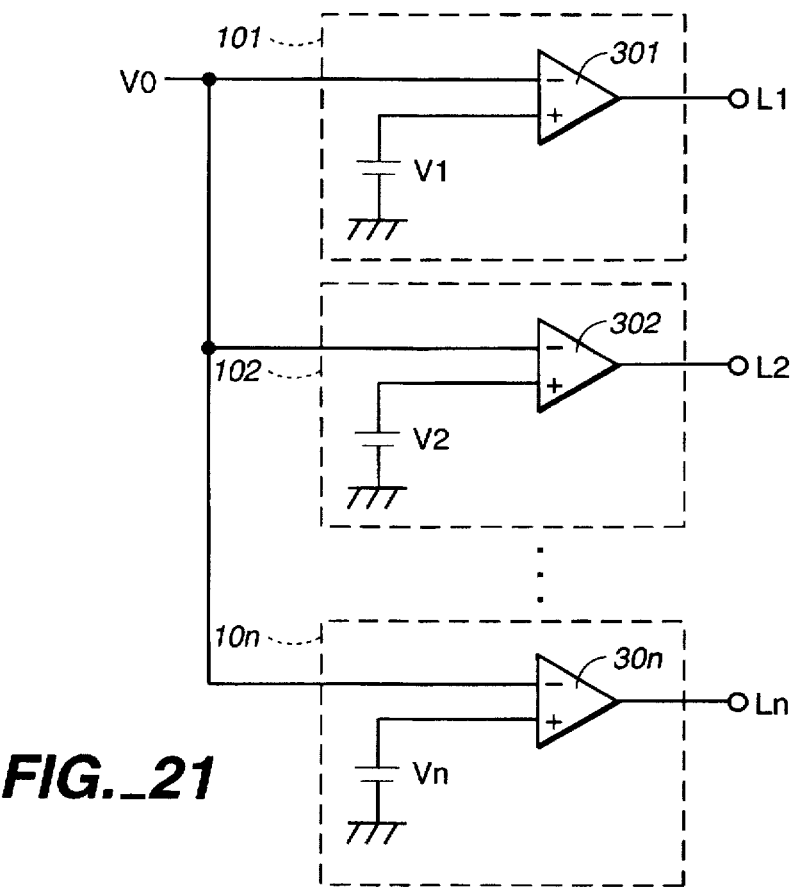
FIG._21

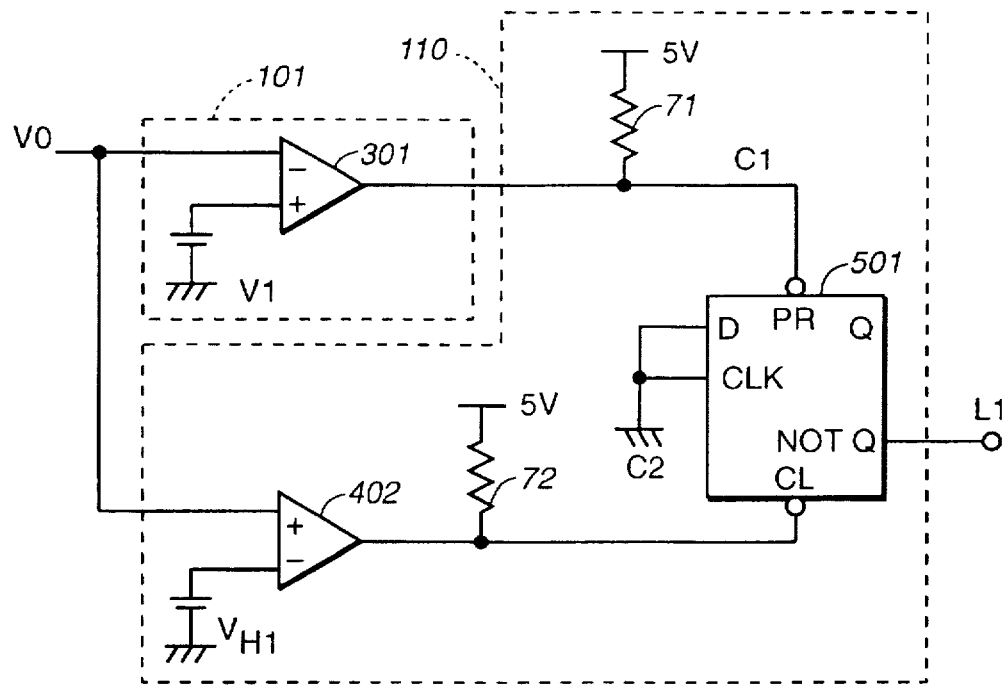
FIG._22
| STATE | INPUT OF 301 | INPUT OF 402 | C1 | C2 | L1 |
|---|---|---|---|---|---|
| 1 | V0 < V1 | V0 ≤ $V_{H1}$ | H | L | H |
| 2 | V0 < V1 | V0 > $V_{H1}$ | H | H | H |
| 3 | V0 ≥ V1 | V0 > $V_{H1}$ | L | H | L |
| 4 | V0 < V1 | V0 > $V_{H1}$ | H | H | L |
| 5 | V0 < V1 | V0 ≤ $V_{H1}$ | H | L | H |
FIG._23

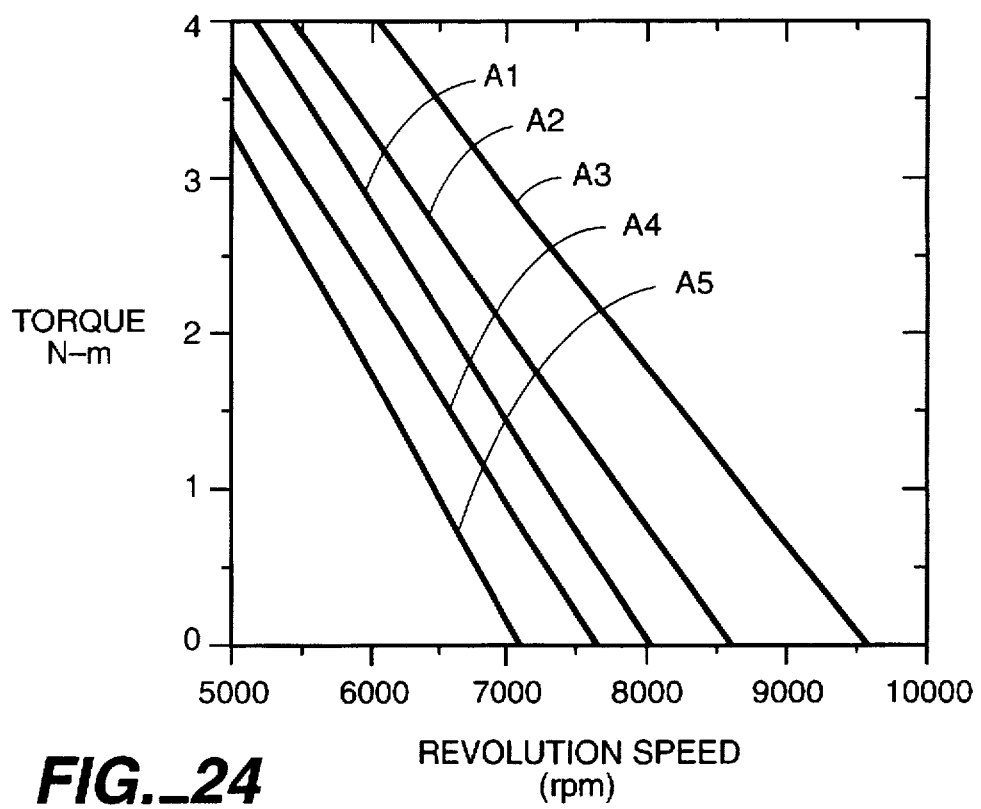
FIG._24
| S3 | S2 | S2 | OPEN PHASE | MODE |
|---|---|---|---|---|
| L | L | L | Wps− | 5 |
| L | L | H | Vps+ | 4 |
| L | H | L | Ups− | 3 |
| L | H | H | Wps+ | 2 |
| H | L | L | Vps− | 1 |
| H | L | H | Ups+ | 0 |
FIG._28

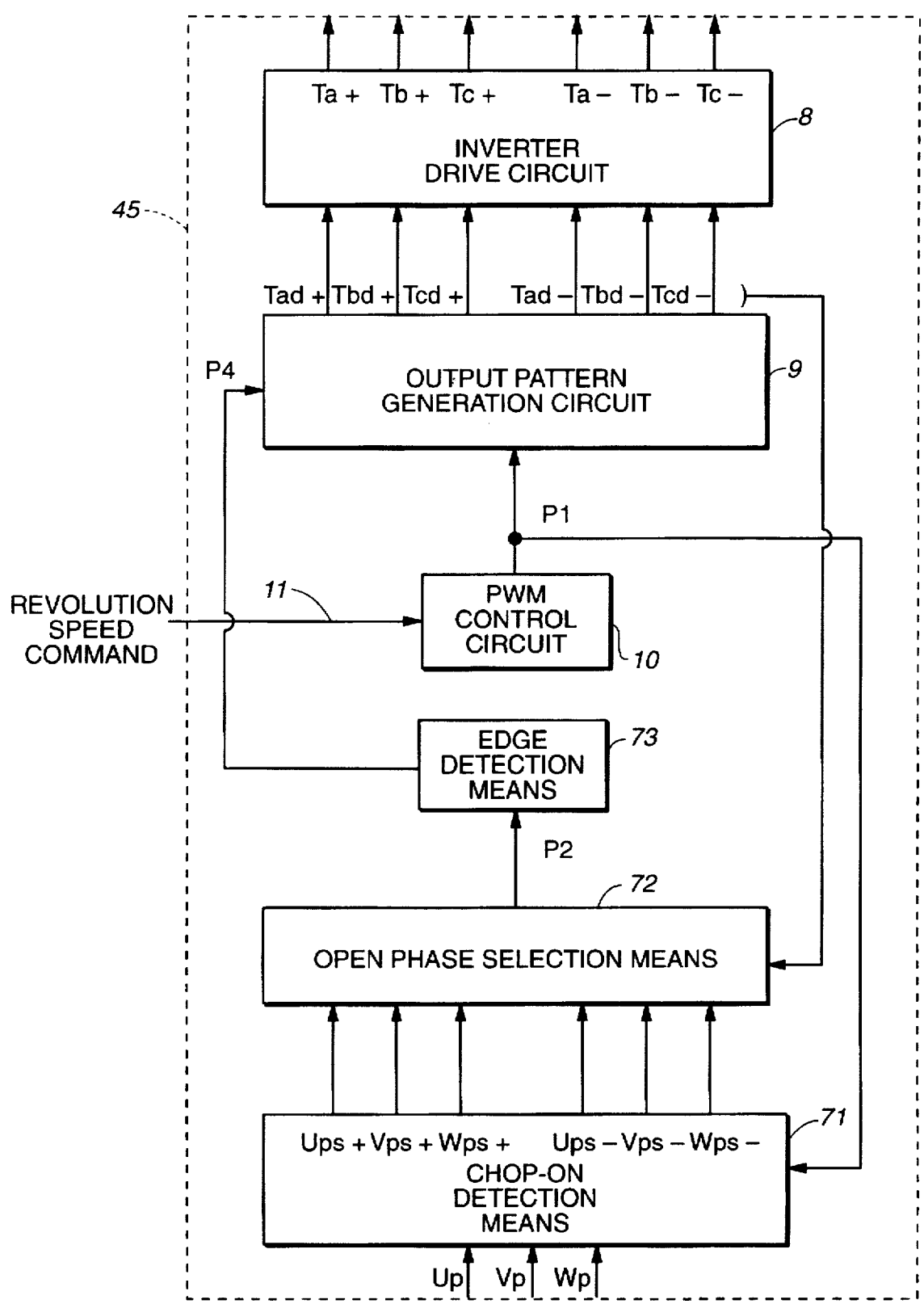
*FIG._25*

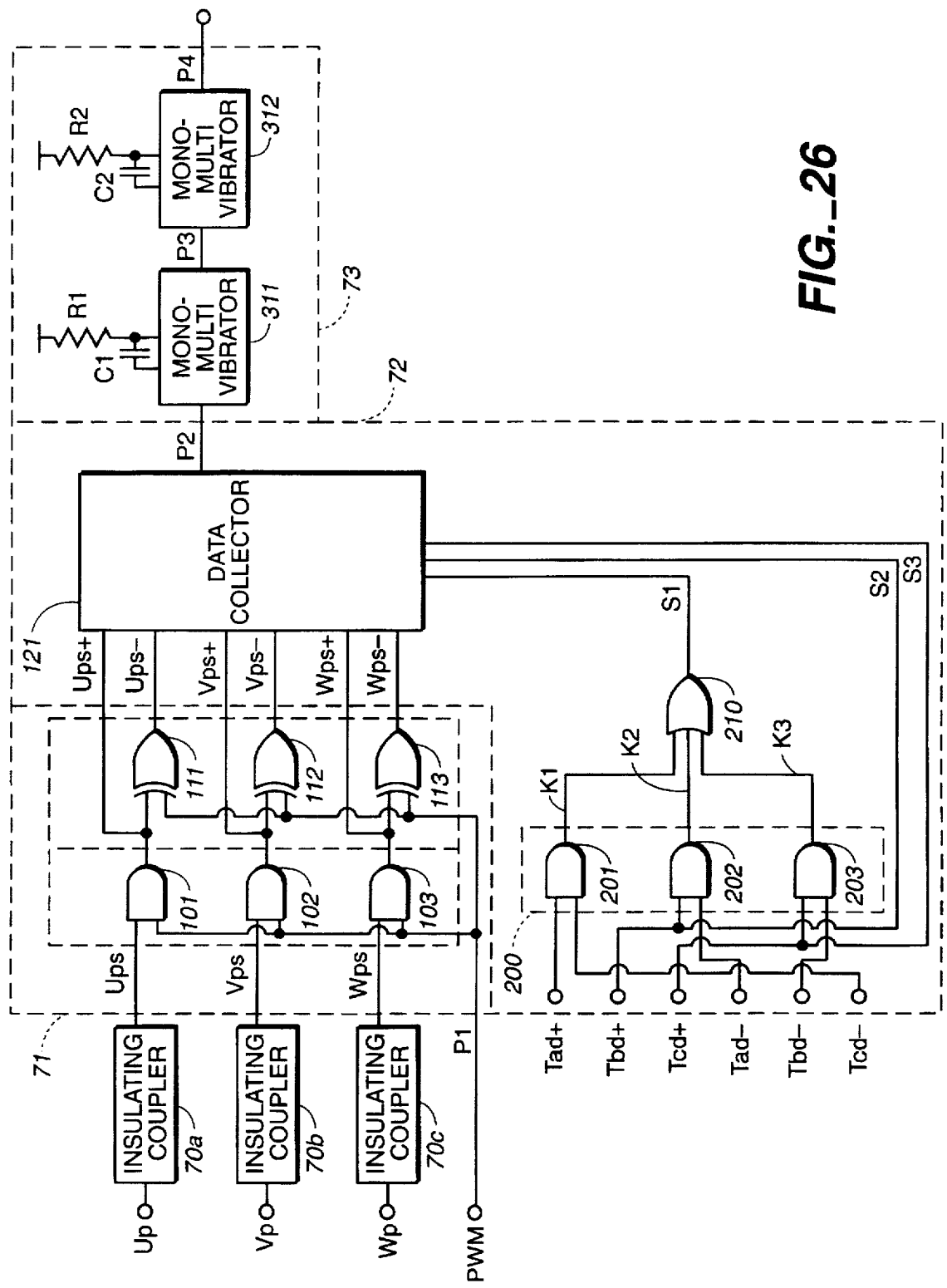
FIG._26

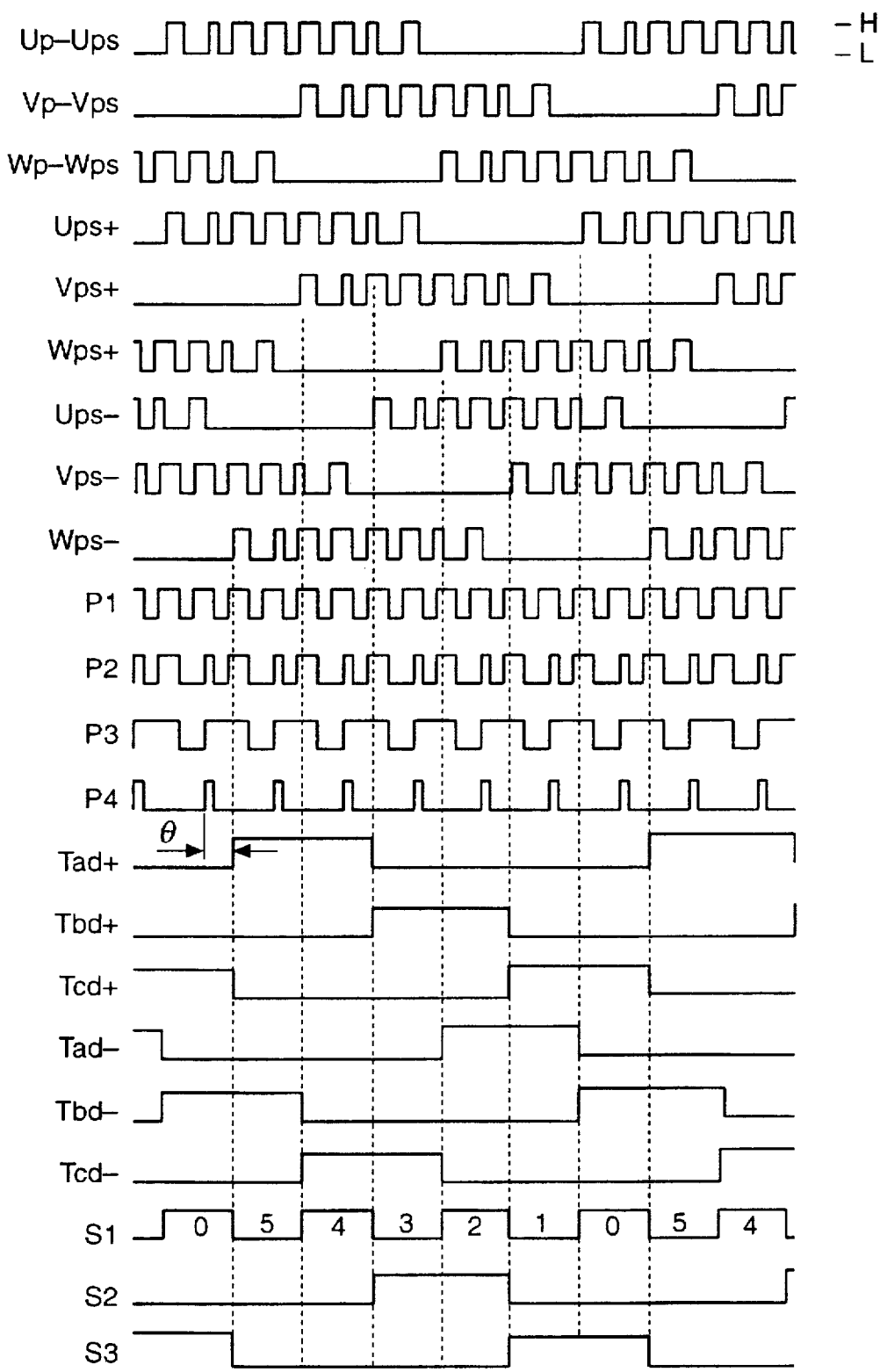
FIG._27

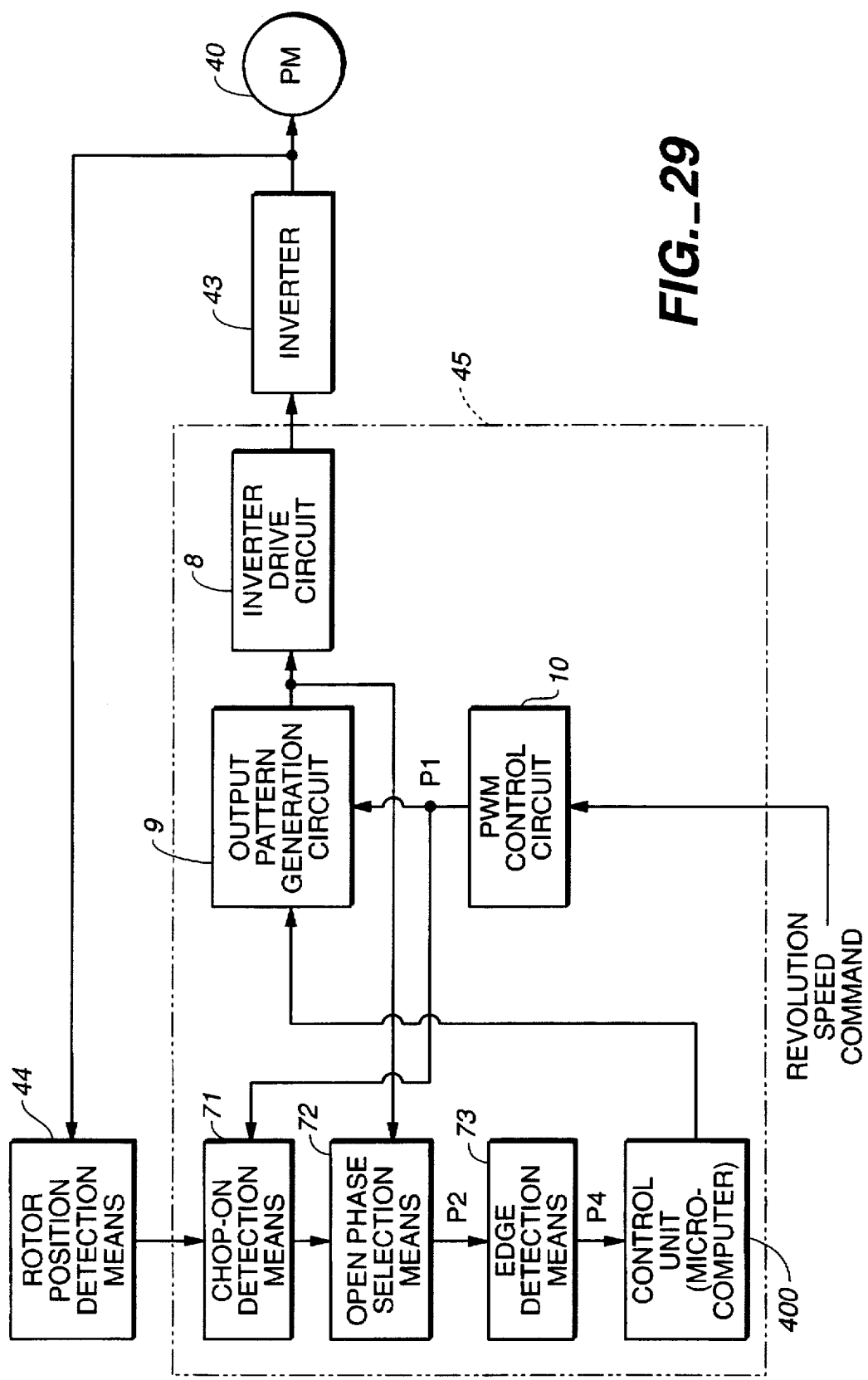
*FIG._29*

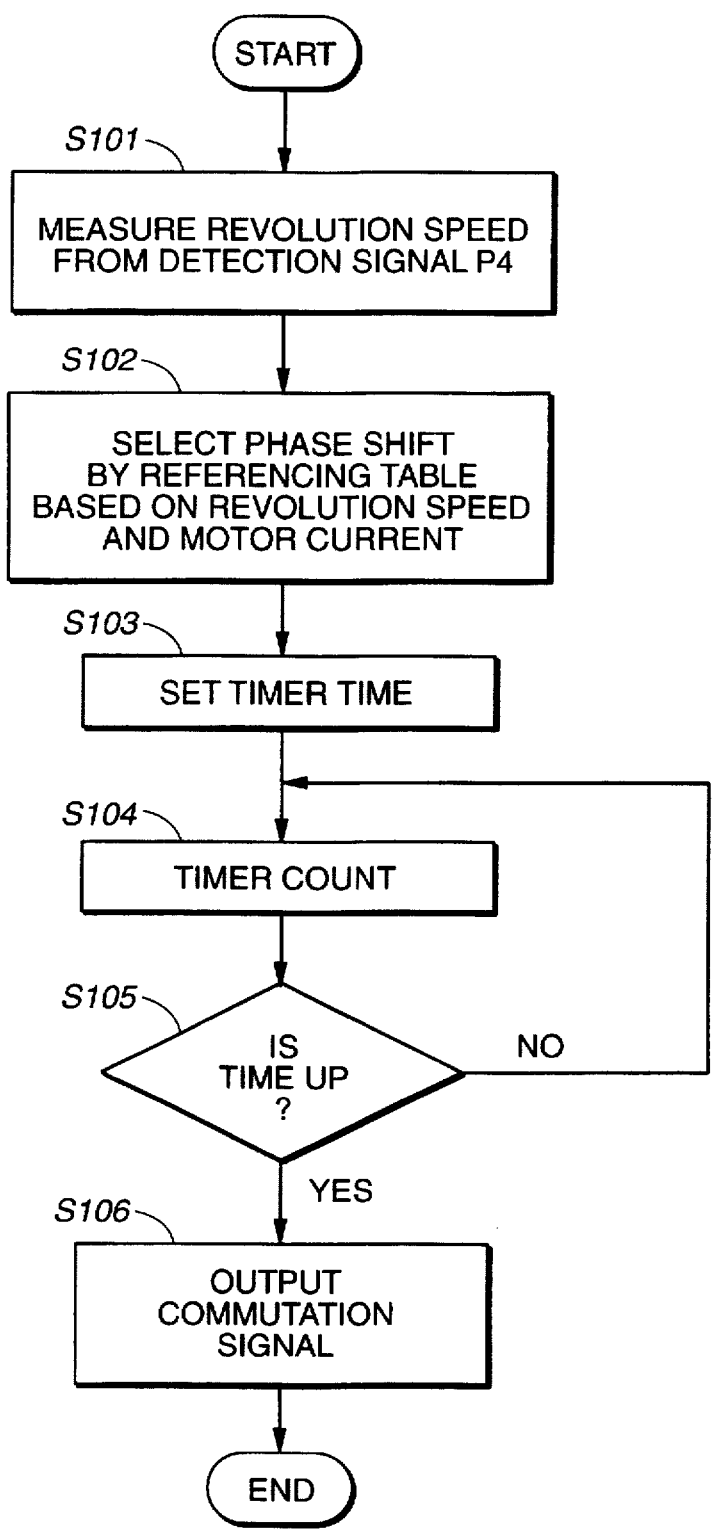
FIG._30

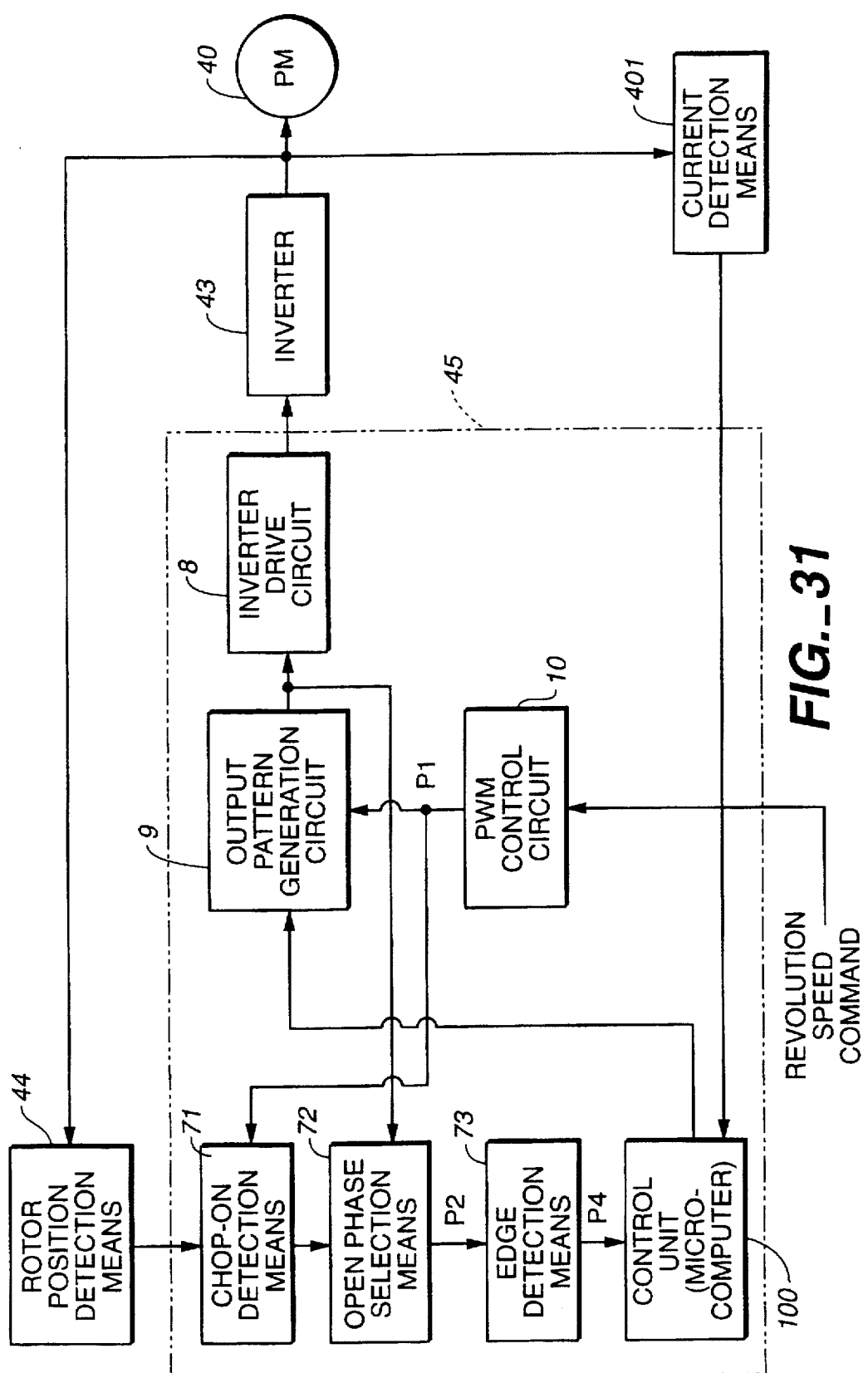
FIG._31

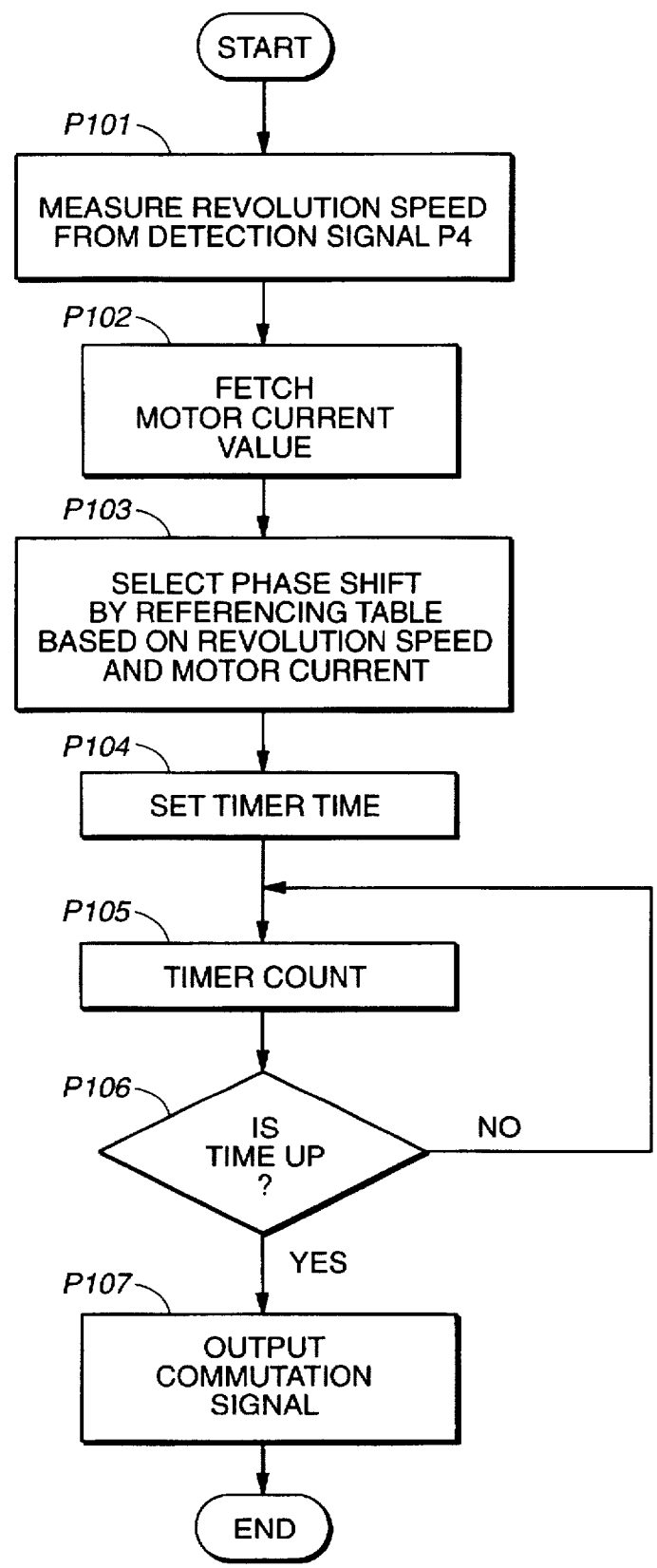
FIG._32

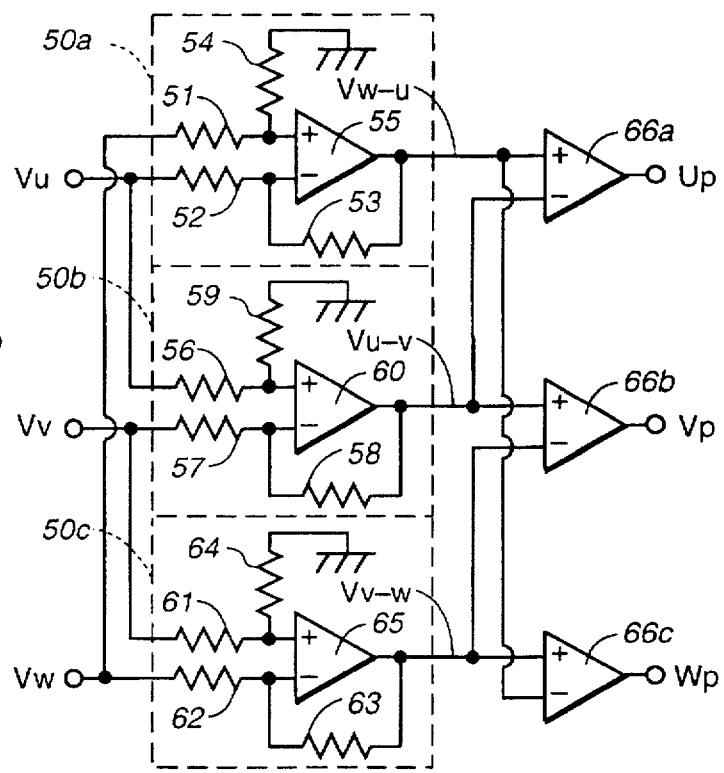
FIG._33
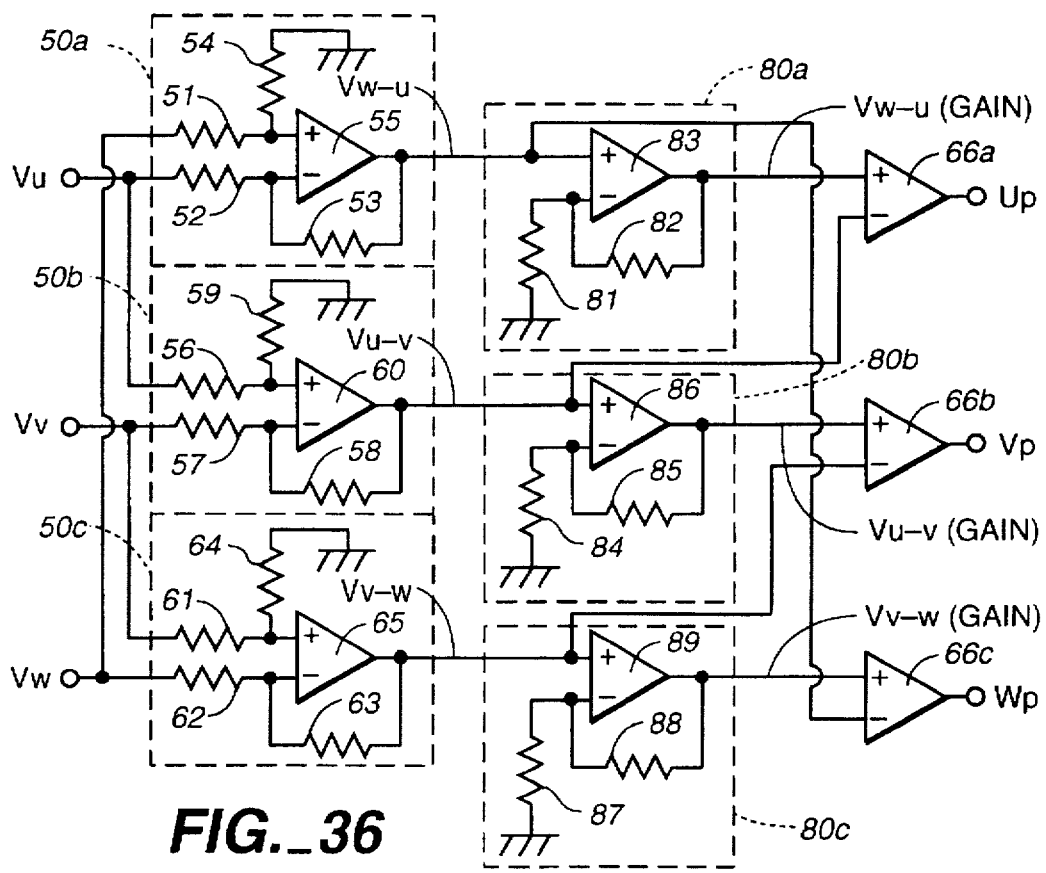
FIG._36

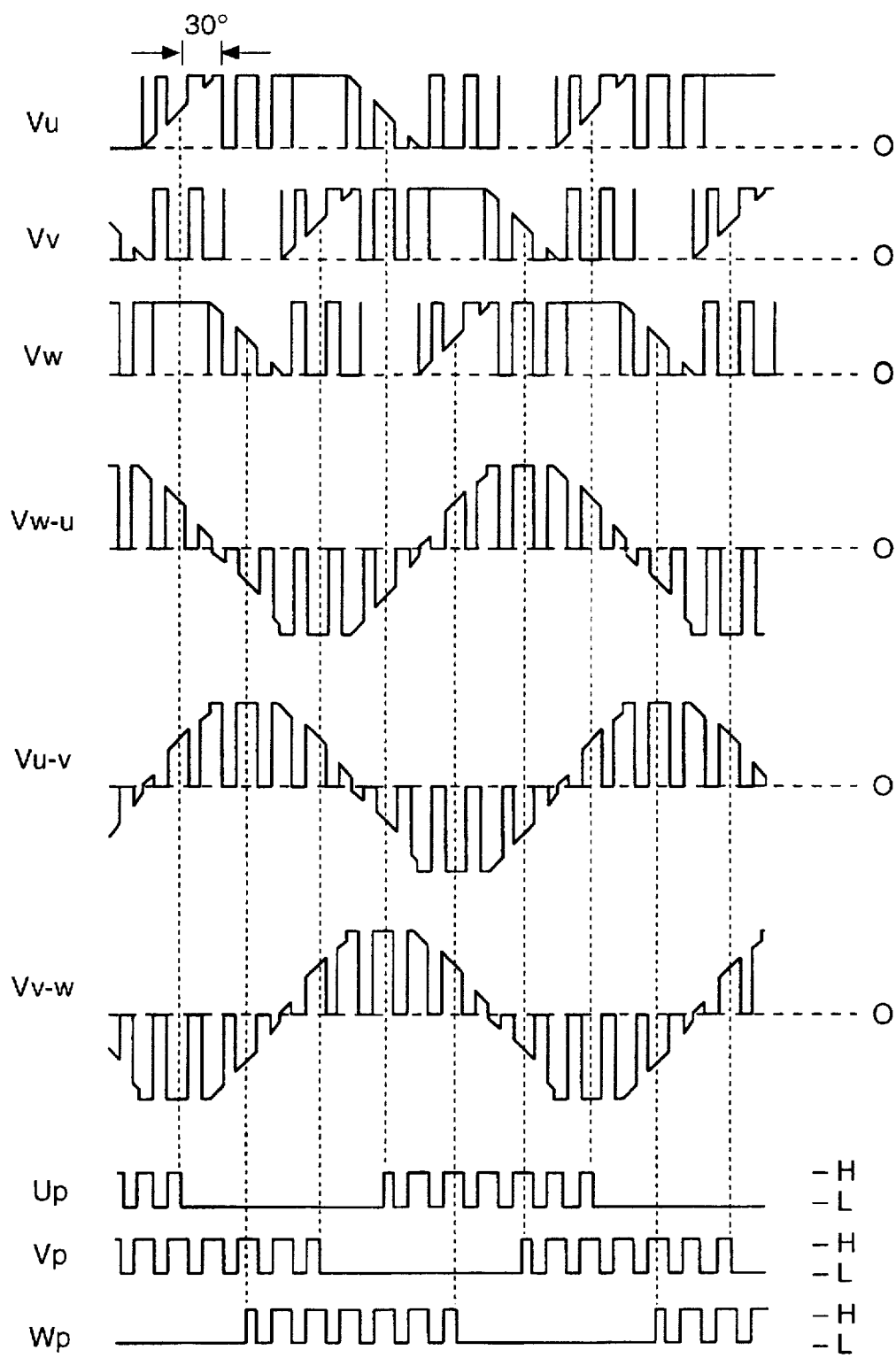
FIG._34

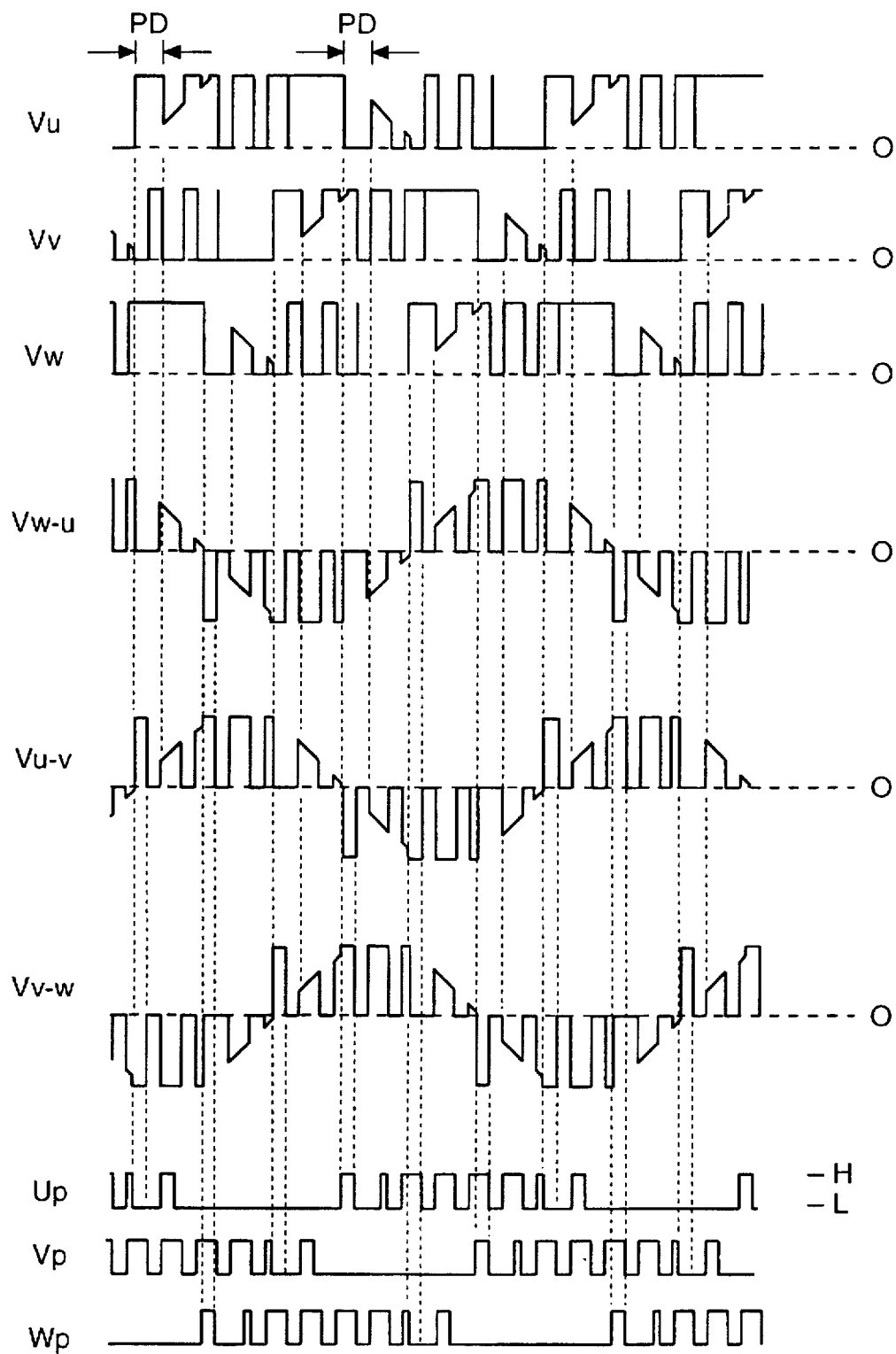
FIG._35

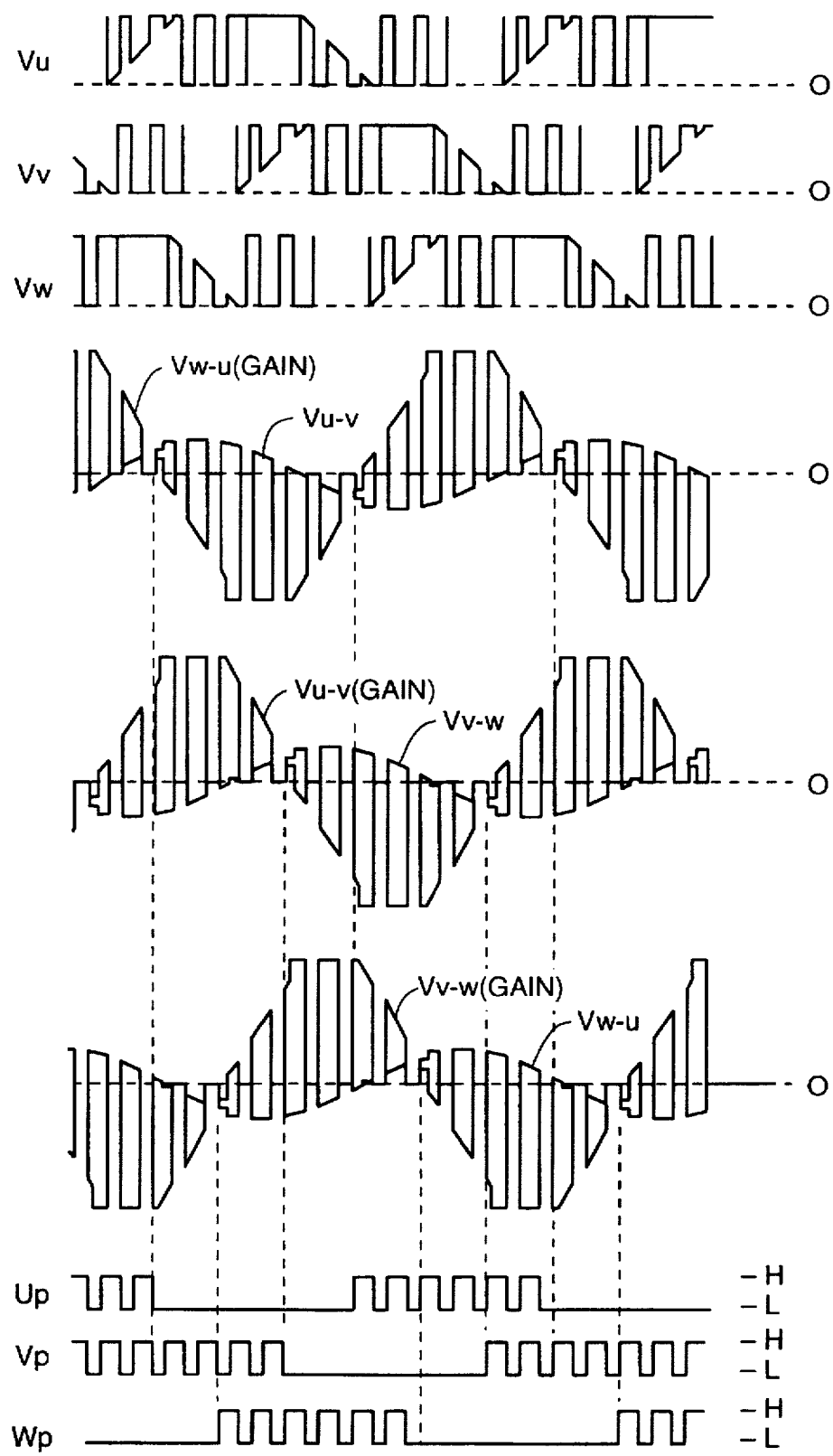
FIG._37

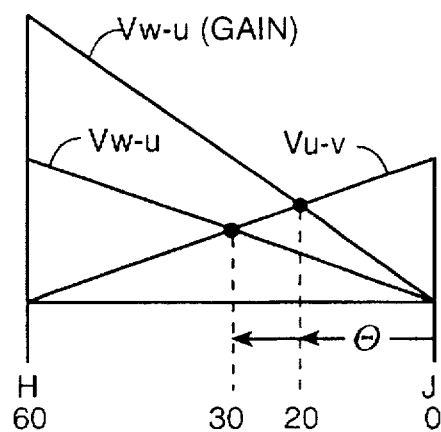
FIG._38
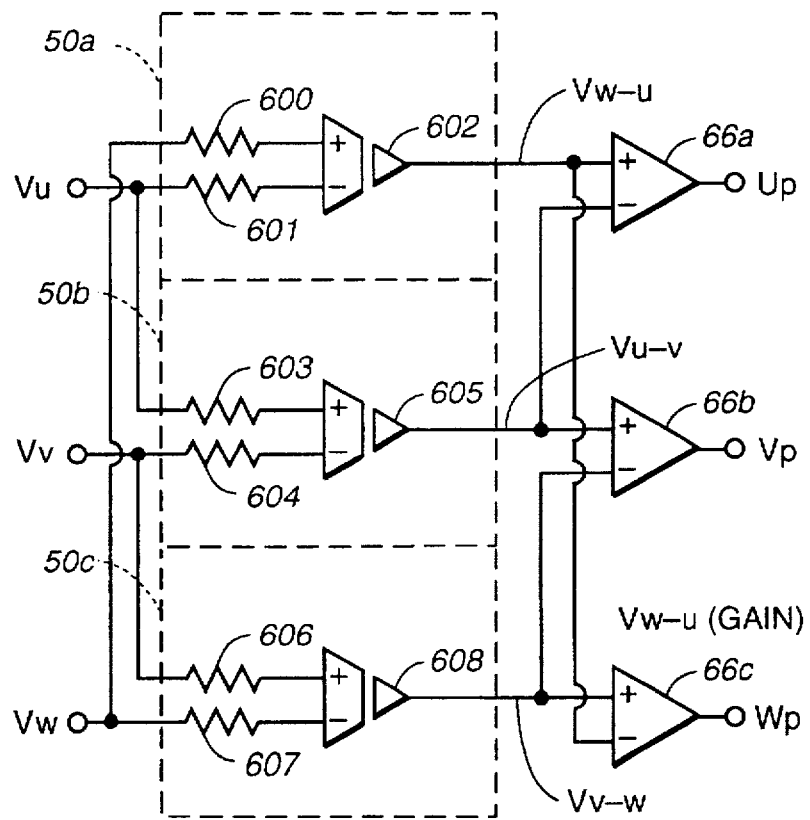
FIG._39

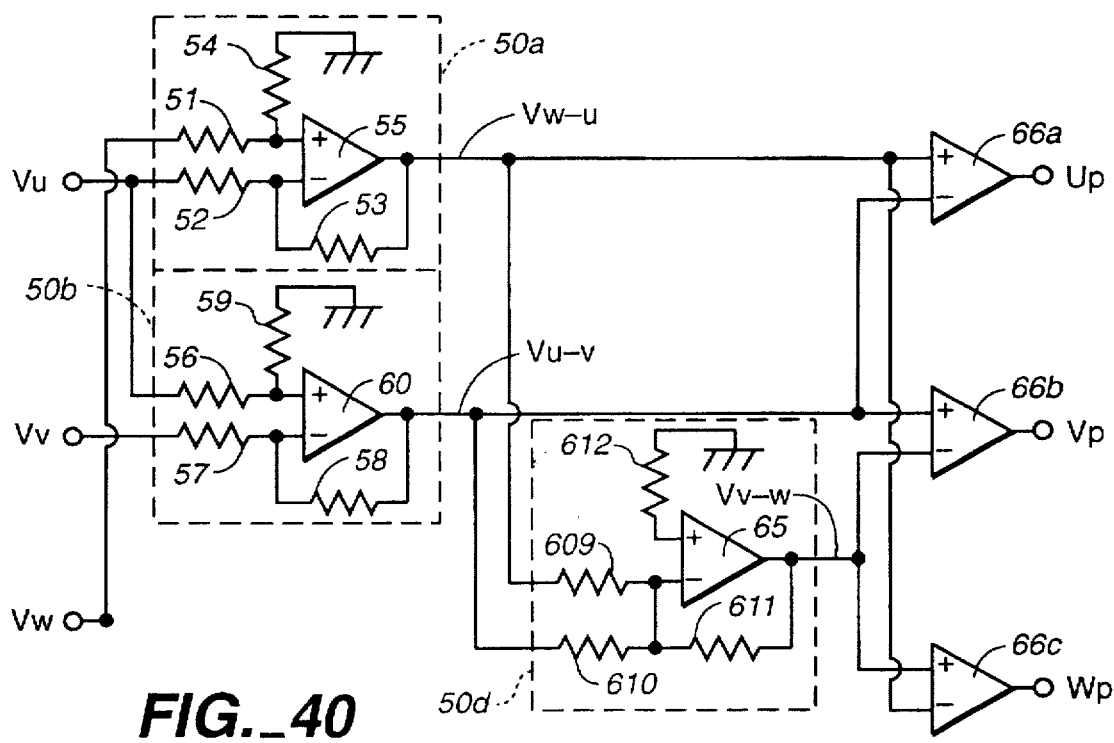
FIG._40
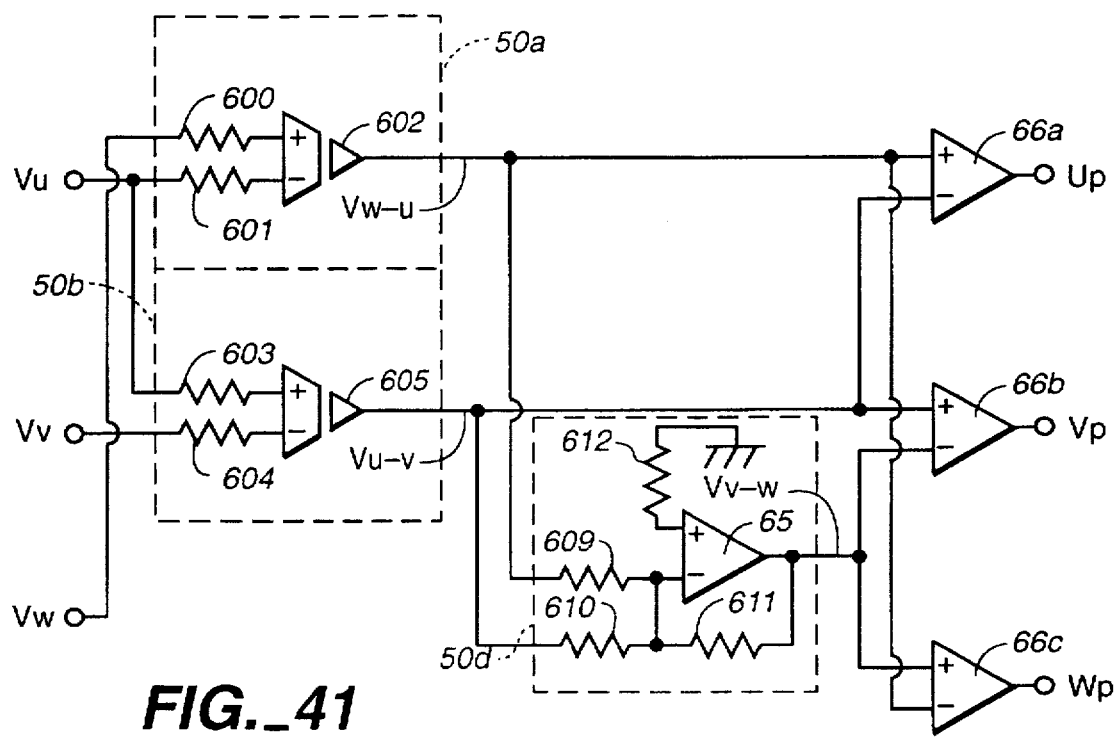
FIG._41

BRUSHLESS DC MOTOR DRIVE APPARATUS

BACKGROUND OF THE INVENTION

1. Field of the Invention

This invention relates generally to a brushless DC motor drive apparatus.

More particularly, the invention relates to a brushless DC motor drive apparatus utilizing back electromotive force, that is ideally suited to a permanent magnet brushless DC motor using an inverter for controlling speed by means of PWM (Pulse Width Modulation) chopper control.

2. Description of the Related Art

A conventional brushless DC motor drive apparatus is explained below.

FIG. 1 is a block diagram showing a conventional positional sensor-less brushless DC motor drive apparatus.

As shown in the figure, a conventional positional sensor-less brushless DC motor drive apparatus comprises rectifying circuit 2, voltage-source inverter 3 with a conducting interval of 120 degrees (inverter) and including 6 semiconductor switching elements, brushless DC motor 4, rotor position detection means 5, and drive control means 7.

The current originating from commercial power supply 1 and rectified by rectifying circuit 2 into the DC current is supplied to the input terminal of inverter 3. The output terminal of inverter 3 is connected to the stator armature winding of brushless DC motor 4, and rotates brushless DC motor 4 by turning the DC current on and off.

Brushless DC motor 4 comprises a stator in which multi-phase armature windings are connected in a star formation and a rotor in which pairs of magnetic poles are formed by permanent magnets. The rotation of the rotor generates a back electromotive force in stator armature winding terminal 6.

The back electromotive force from stator armature winding terminal 6 is input into rotor position detection means 5. Rotor position detection means 5 performs rotor position detection, and the result is input into drive control means 7 as a pulse signal.

Drive control means 7 comprises inverter drive circuit 8, output pattern generation circuit 9, and PWM (Pulse Width Modulation) control circuit 10.

Output pattern generation circuit 9 determines the pattern for driving the gate of each switching element of inverter 3 according to the detection timing input from rotor position detection means 5. Furthermore, output pattern generation circuit 9 generates a signal by combining this pattern with the output of PWM control circuit 10 which determines the ON/OFF duty ratio of the PWM chopper control circuit based on rotation count instruction 11, and sends this signal to inverter drive circuit 8. This inverter drive circuit 8 then drives each gate of inverter 3.

Next, rotor position detection means 5 of the conventional positional sensor-less brushless DC motor drive apparatus is explained below. FIG. 2 is a circuit diagram showing the part of rotor position detection means 5 that corresponds to one phase.

As shown in the figure, rotor position detection means 5 comprises voltage-dividing circuit 20 including resistors 21 and 22, capacitor 23 for removing the DC component, first order lag filtering circuit 24 including resistor 25 and capacitor 26, and comparison circuit 27 consisting of resistors 28, 29, and 30, and comparator 31.

The terminal voltage from stator armature winding terminal 6 is input into voltage-dividing circuit 20 from input terminal 32, and this terminal voltage is detected according to the divided voltage ratio of resistor 21 and resistor 22 with 0 V of the DC current source used as the reference.

This detected terminal voltage contains other elements such as a high-frequency component resulting from the PWM chopper control, spike voltage occurring in the reflux mode after commutation, and a DC element offset stemming from the variation in resistor 21 and resistor 22 of voltage-dividing circuit 20, in addition to the fundamental wave component of the back electromotive force. In order to reduce these other elements, capacitor 23 for eliminating DC components is connected, and first order lag filtering circuit 24 is used to reduce the high-frequency component and to shift the phase by 90°.

Comparison circuit 27 compares the output of first order lag filter 24 and reference voltage 34, and outputs a rotor position detection signal as a pulse signal to output terminal 33. Either the neutral position voltage of the stator armature winding is directly used as reference voltage 34, or the neutral position voltage obtained by adding the terminal voltage after said first order lag filter 24 is used as reference voltage 34.

Because the detection signal that is phase-shifted by 90° is used as the rotor position detection signal delayed by 120° from the original detection signal, the motor is driven at a current phase angle of nearly 0°. For example, when U, V, and W phases are used for drive, the signal detected at the terminal voltage of the U phase is used as the rotor position detection signal of the W phase.

One of two types of rotors is generally used in brushless DC motor 4. The first is the surface magnet type shown in FIG. 3, which comprises yoke 12 for forming a magnetic path and slate-shaped (arc-shaped) permanent magnet 13 for the magnetic field, wherein slate-shaped (arc-shaped) permanent magnet 13 for the magnetic field is adhered to the exterior surface of yoke 12. The second is the interior permanent magnet type shown in FIG. 4, in which the rotor comprises yoke 15 for forming a magnetic path and permanent magnet 16 for the magnetic field, wherein permanent magnet 16 for the magnetic field is inserted in a slot provided in yoke 15. An ideal method for controlling these rotors has been suggested. (Refer to "Wide Speed Control of Interior Permanent Magnet Synchronous Motor" by Morimoto, Ueno, and Takeda; 1994 Collection of Articles D, Society of Electrical Engineers, Vol. 114, No.6, pp 668–673.)

In general, when a d-q coordinate system is used, the torque of a brushless DC motor using permanent magnets is expressed as the equation shown below.

$$T = p \cdot \{\Phi mag \cdot iq + (Ld - Lq) \cdot id \cdot iq\} \tag{1}$$

where T is torque, p is pole pair count, Φmag is the armature interlinking magnetic flux caused by the permanent magnet, id and iq are d-axis and q-axis components of the armature current, respectively, and Ld and Lq are d-axis inductance and q-axis inductance, respectively.

When I and θ are used to designate the amplitude of the armature current and the phase angle (current phase angle) of the armature current to the q axis, respectively, id and iq are defined as follows.

$$id = -I \cdot \sin\theta \tag{2}$$

$$iq = I \cdot \cos\theta \tag{3}$$

where I is the amplitude of the armature current and θ is the current phase angle viewed from the q axis.

Using definition equations (2) and (3), torque equation (1) can be converted as follows.

$$T = P \cdot \{\Phi mag \cdot I \cdot \cos\theta + L1 \cdot I^2 \sin 2\theta\} \quad (4)$$

where L1 is expressed as follows.

$$L1 = (Lq - Ld)/2 \quad (5)$$

In the case of the surface magnet type rotor shown in FIG. 3, a non-saliency condition (Ld=Lq) is present wherein d-axis inductance and q-axis inductance are equal. Consequently, the second term in torque equation (1) becomes 0, and the motor torque occurs in proportion to q-axis current iq. Likewise, the second term in equation (4) also becomes 0, maximizing the torque when current phase angle θ is 0. In other words, based on equations (2) and (3), current phase angle θ of 0 and id=0 provide the optimal operation conditions for brushless DC motors possessing a non-salient surface magnet-type rotor. This method is generally called id=0 control because the d-axis current is kept at 0.

As shown in FIG. 3, the exterior perimeter of the surface magnet type rotor is covered by non-magnetic sleeve 14 which prevents the permanent magnets from flying off during high-speed rotation.

On the other hand, in the embedded magnet-type rotor shown in FIG. 4, magnetic poles are provided by permanent magnet 16 for the magnetic field on the perimeter of yoke 15 including layered multiple silicon steel plates. Therefore, this type of rotor can rotate at high speeds without the risk of magnets flying off. Because the magnetic equivalent air gap in the d-axis direction is smaller than that in the q-axis direction, reverse saliency (Ld<Lq) occurs wherein the q-axis inductance is larger than the d-axis inductance.

Consequently, the motor torque generated based on torque equation (1) consists of the torque from the magnet, which is proportional to the first term q-axis current iq, and the reluctance torque generated by the reverse saliency in the second term. Therefore, based on torque equation (4), a current phase angle θ (hereafter referred to as "lead angle θ") that results in the largest combined total of the torque produced by the magnet and the reluctance torque, is the optimal operating condition for brushless DC motors possessing a reverse-salient embedded magnet-type rotor. This method is generally called maximum torque control because it effectively utilizes the reluctance torque. FIG. 5 shows the relationship between lead angle θ and motor torque T when maximum torque control is performed.

Furthermore, a method of controlling the interior permanent magnet type has been proposed that expands the high-speed rotation range by means of an equivalent field-weakening control which actively utilizes reluctance torque. In this method, the maximum torque control is used to optimally control the operation up to the range in which the maximum voltage to be applied to the motor becomes equal to the back electromotive force of the motor. Normally, the motor cannot operate at speeds higher than this because the maximum application voltage becomes equal to the back electromotive force. However, by advancing lead angle θ further to actively cause the d-axis current, it is possible to weaken the armature interlinking magnetic flux of the permanent magnet using the d-axis armature reaction. The high-speed rotation operation range can be expanded by controlling this equivalent field-weakening control to achieve constant motor output. This method is generally called maximum output control.

Because conventional rotor position detection means 5 uses first order lag filter 24 to cut the high-frequency components from the terminal voltage of stator armature winding terminal 6, and at the same time shifts the phase of the terminal voltage by 90°, the cut-off frequency of first order lag filter 24 is set in the range of several to dozens of Hz.

The fundamental wave component of the back electromotive force generated in stator armature winding terminal 6 by rotor rotation is generally varied depending on the motor rotation range up to several hundred Hz. Consequently, increases in the rotational frequency of brushless DC motor 4 cause detection delays in the phase of the rotor position detection signal that has passed first order lag filter 24, spike voltage occurs in the reflux mode after commutation, and the pulse width increases due to current load, causing detection advance. Because of these factors, an accurate commutation phase cannot be obtained. In particular, the delayed-phase operation occurring during high-speed rotation drive limits the operational range and lowered motor efficiency.

Therefore, in the conventional configuration of rotor position detection means 5, it is difficult to optimally operate brushless DC motor 4; particularly with the interior permanent magnet-type rotor, it is necessary to control lead angle θ to be ahead of the motor torque as shown in FIG. 5, making it impossible to achieve the full performance of the motor.

The above-mentioned maximum output control is also used to expand the operational range of a positional sensorless brushless DC motor possessing an interior permanent magnet-type rotor structure.

However, a high-resolution encoder is required in order to precisely control lead angle θ, resulting in higher costs. Furthermore, because positional sensor-less brushless DC motors are often used under a special environment, high-resolution encoders or rotor position sensors such as Hall elements cannot be used.

SUMMARY OF THE INVENTION

Therefore, it is an object of the present invention to overcome the aforementioned problems by providing a brushless DC motor drive apparatus that can always detect accurate rotor position without being affected by the rotational frequency or load of the brushless DC motor.

Another object of this invention is to provide a brushless DC motor drive apparatus that can easily expand the operational range of a brushless DC motor, particularly that of a brushless DC motor possessing an embedded magnet-type rotor structure.

A further object of this invention is to provide a brushless DC motor drive apparatus that can appropriately, easily, and accurately operate a brushless DC motor according to its motor characteristics and control method, etc.

To achieve these and other objects, the brushless DC motor drive apparatus according to the invention comprises a motor which includes a stator and a rotor, the stator including multi-phase armature windings which are connected in a star formation and generate a plurality of terminal voltages at respective terminals of the armature windings, and the rotor including a plurality of permanent magnets which form pairs of magnetic poles. The motor drive apparatus also includes an inverter coupled to the rotor for adjusting the speed of the rotor, a rotor position detection means for detecting the terminal voltages generated in the armature windings and for generating a position signal indicative of a magnetic pole position of the rotor. The rotor position detection means includes a line voltage generation means for generating line voltages corresponding to the terminal voltages of the armature windings and comparison means for comparing signals derived from the line voltages in predetermined combinations and outputting comparison signals as the positional signal. The motor drive apparatus also includes a drive control means for controlling and driving the inverter according to the position signal generated by the rotor position detection means, the drive control means including PWM (Pulse Width Modulation) chopper control means for generating a PWM chopper control signal to control the inverter.

This configuration prevents phase shift during rotor magnetic pole position detection when first order lag filter, for example, is installed, and enables accurate rotor magnetic pole position detection that follows the rotational frequency of the brushless DC motor. Efficiency can thus be improved.

Furthermore, the drive control means preferably includes a chop-on detection means for detecting the comparison signals from the comparison means of the rotor position detection means synchronously with the chop-on timing of PWM chopper control signal from the PWM chopper control means and generating data signals, an open-phase selection means for selecting an open phase signal from among the data signals output by the chop-on detection means during an open phase, and an edge detection means for detecting specified edges of the open phase signal output by the open phase selection means.

This configuration can eliminate the spike voltage occurring in the reflux mode after commutation and other external disturbances, and can appropriately and accurately detect rotor magnetic pole positions regardless of the load size during the operation of a brushless DC motor. Therefore, normal operation can always be performed.

Additionally, the drive control means preferably includes a commutation control means that performs controls such that a commutation signal is output after the rotor is rotated by a specified phase shift following the detection of a specified magnetic pole position of the rotor by the rotor position detection means.

This configuration easily expands the operational range of a brushless DC motor because it allows the timing to output the commutation signal to be arbitrarily set. Furthermore, the motor can be operated according to its motor characteristics, resulting in higher efficiency.

Furthermore, the rotor position detection means preferably includes an amplification means for amplifying the line voltages that are output by the line voltage generation means and outputting amplified signals. The comparison means preferably compare the line voltages and the amplified signals according to specified combinations.

This configuration can expand the operational range of a brushless DC motor because it allows the rotor magnetic pole position detection phase to be advanced beyond 30° or delayed from 30°. Furthermore, the rotor magnetic pole position detection phase can be easily changed by changing the line voltage amplification rate.

In this case, a commutation control means is preferably provided for performing control such that a commutation signal is output synchronously with the detection of a specified magnetic pole position of the rotor when the specified magnetic pole position of the rotor is detected by the rotor position detection means; and more particularly a commutation control means is preferably provided for performing control such that a commutation signal is output after the rotor is rotated by a specified phase shift following the detection of a specified magnetic pole position of the rotor by the rotor position detection means.

Additionally, when the phase angle of the current flowing through the stator armature winding relative to the q axis in the d-q coordinate system is defined as current phase angle $\theta$, the rotor position detection means is preferably configured to detect the specified magnetic pole position of the rotor whereas the current phase angle $\theta$ is advanced by 30° or less in terms of electrical angle.

Furthermore, the line voltage generation means preferably includes an isolation amplifier.

In this case, the isolation amplifier can electrically isolate the DC power supply from the subsequent stage of the rotor position detection means, thus eliminating the need for an insulation means such as an insulation coupler.

Additionally, the line voltage generation means preferably includes a first line voltage generation means for generating a first line voltage, a second line voltage generation means for generating a second line voltage, and a third line voltage generation means for generating a third line voltage based on the first line voltage and the second line voltage. Furthermore, the first line voltage generation means and the second line voltage generation means each preferably include an isolation amplifier.

In this case, the DC power supply can be electrically isolated from the subsequent stage of the rotor position detection means, and one of the isolation amplifiers, which are more expensive than operational amplifiers, can be eliminated.

To achieve the above objects, another embodiment of the brushless DC motor drive apparatus according to the invention comprises a motor including a stator in which 3-phase armature windings U, V, and W are connected in a star formation, and a rotor in which pairs of magnetic poles are formed by permanent magnets.

The motor drive apparatus also comprises an inverter with a conducting interval of 120° coupled to the rotor for adjusting the rotor speed, a rotor position detection means for detecting the terminal voltage generated in the stator armature windings and for generating a position signal indicative of a magnetic pole position of the rotor, and drive control means for controlling and driving the inverter according to the position signal generated by the rotor position detection means. The drive control means includes PWM chopper control means for generating a PWM chopper control signal to control the inverter.

The rotor position detection means includes line voltage generation means for generating line voltages corresponding to the terminal voltages of the armature windings, amplification means for amplifying the line voltages and outputting amplified signals, and comparison means for comparing the line voltages and the amplified signals according to predetermined combinations and outputting comparison signals as the position signal.

The line voltage generation means of the rotor position detection means comprises a first line voltage generation means for generating a line voltage Vw-u between armature windings W and U, a second line voltage generation means for generating a line voltage Vu-v between armature windings U and V, a third line voltage generation means for generating a line voltage Vv-w between armature windings V and W.

The amplification means of the rotor position detection means includes a first amplification means for amplifying a signal derived from line voltage Vw-u output by the first line voltage generation means and outputting a second amplified signal, and a second amplification means for amplifying a signal derived from line voltage Vu-v output by the second line voltage generation means and outputting a second amplified signal, and a third amplification means for amplifying a signal derived from line voltage Vv-w output by the third line voltage generation means and outputting a third amplified signal.

The comparison means of the rotor position detection means includes a first comparison means for comparing the signal derived from the line voltage Vw-u with the second amplified signal output by the second amplification means and outputting a first comparison signal, a second comparison means for comparing the signal derived from the line voltage Vu-v with the third amplified signal output by the third amplification means and outputting a second comparison signal, and a third comparison means for comparing the signal derived from the line voltage Vv-w with the first amplified signal output by the first amplification means and outputting a third comparison signal. The position signal generated by the rotor position detection means includes the first, second and third comparison signals.

More particularly, the rotor position detection means detects the specified magnetic pole position of the rotor when the current phase angle θ has advanced by 30° or more in electrical angle when the phase angle of the current flowing through the stator armature winding relative to the q axis in the d-q coordinate system is defined as current phase angle θ.

This configuration enables accurate detection of rotor magnetic poles and expands the range in which the lead angle can be set, and thus can expand the operational range of a brushless DC motor and improve its efficiency.

In these cases, the first comparison means preferably outputs a high-level signal when the signal derived from the line voltage Vw-u is larger than the second amplified signal output by the second amplification means; the second comparison means preferably outputs a high-level signal when the signal derived from the line voltage Vu-v is larger than the third amplified signal output by the third amplification means; and the third comparison means preferably outputs a high-level signal when the signal derived from the line voltage Vv-w is larger than the first amplified signal output by the first amplification means.

Furthermore, the rotor position detection means preferably includes an application voltage determination means for detecting an application voltage applied to the motor, and the motor drive apparatus preferably further includes first, second, and third gain switching means for switching the gain of the first, second, and third amplification means respectively into two stages.

In this case, line voltage amplification rates can be changed by the first, the second, and the third gain switching means, and thus the operational range can be further expanded.

The application voltage determination means preferably includes a hysteresis circuit for changing the operation timing of the first, second, and third gain switching means according to specified criteria depending on whether the motor application voltage is rising or falling.

This configuration enables arbitrary operation of an expanded area.

Additionally, the rotor position detection means preferably includes n application voltage determination means (where n is an integer of at least 2) for detecting an application voltage applied to the motor, and the motor drive apparatus preferably further includes n gain switching means for changing the gain of the first, second, and third amplification means based on the signals generated from the associated application voltage determination means.

This configuration makes it possible to expand the operational range of the motor in stages during its operation.

Furthermore, the drive control means preferably includes a chop-on detection means for detecting the comparison signals from the comparison means of the rotor position detection means synchronously with the chop-on timing of PWM chopper control signal from the PWM chopper control means and generating data signals, an open phase selection means for selecting an open phase signal from among the data signals output by the chop-on detection means during an open phase, and an edge-detection means for detecting specified edges of the open phase signal output by the open phase selection means.

In this case, the drive control means preferably includes a commutation control means for supplying a commutation signal after the rotor rotates by a specified phase shift following the detection of a specified magnetic pole position of the rotor by the rotor position detection means, and a shift setting means is preferably provided for setting the phase shift.

Furthermore, the drive control means may preferably include a commutation control means for supplying a commutation signal synchronously with the detection of a specified magnetic pole position of the rotor by the rotor position detection means.

In this case, the drive control means may preferably also include a shift setting means for setting the phase shift.

Furthermore, the setting of phase shift by the shift setting means is preferably changed according to at least the revolution speed of the rotor; and more particularly the setting of phase shift by the shift setting means is preferably changed according to the revolution speed of the rotor and motor current.

Such a configuration makes it possible to appropriately, easily, and accurately operate a brushless DC motor according to its motor characteristics and control method, etc. Appropriate angles of lead can also be set according to rotation count and motor current.

Additionally, the rotor preferably exhibits reverse saliency.

In this case, the rotor preferably includes a yoke having slots formed therein at the positions corresponding to magnetic poles, and the permanent magnets are inserted in these slots, so that the permanent magnets are not exposed to the exterior perimeter of the rotor.

In another embodiment, the invention comprises a motor including a stator including multi-layer armature windings which are connected in a star formation and generate a plurality of terminal voltages at respective terminals of the armature windings, and a rotor including plurality of permanent magnets which form pairs of magnetic holes, an inverter coupled to the rotor for adjusting the rotor speed, a rotor position detection means for detecting the terminal voltage generated in the stator armature winding and for generating a position signal indicative of a magnetic pole position of the rotor, and for detecting the magnetic pole position of the rotor when the current phase angle θ has advanced by 0° to 30° in electrical angle, based on the terminal voltages generated by the stator armature windings, wherein the phase angle of the current flowing through the stator armature windings relative to the q axis of the d-q coordinate system is defined as current phase angle θ, and a drive control means for controlling and driving the inverter according to the position signal generated by the rotor position detection means, the drive control means including PWM chopper control means for generating a PWM chopper control signal to control the inverter.

In this embodiment, the drive control means may also include a commutation control means for supplying a commutation signal after the rotor rotates by a specified phase shift following the detection of a specified magnetic pole position of the rotor by the rotor position detection means.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 1 is a block diagram showing a conventional sensor-less brushless DC motor drive apparatus;

FIG. 2 is a circuit diagram showing part of the rotor position detection means of a conventional sensor-less brushless DC motor, that corresponds to one phase;

FIG. 3 is a top view schematically showing a surface magnet type rotor;

FIG. 4 is a top view schematically showing an embedded magnet-type rotor;

FIG. 5 is a graph showing lead angle θ—torque T characteristics when the maximum torque control is performed;

FIG. 6 is a block diagram showing a configuration example of the brushless DC motor drive apparatus according to the present invention;

FIG. 7 is a diagram showing the excitation pattern of the brushless DC motor according to the present invention;

FIG. 8 is a diagram showing the relationship between back electromotive forces ea, eb, and ec of U phase, V phase, and W phase, respectively, and the drive signal when lead angle is 0° in the brushless DC motor according to the present invention;

FIG. 9 is a circuit diagram showing an equivalent circuit when Ta+ and Tb− are electrically connected in the chopper control in the present invention;

FIG. 10 is a diagram showing the detection timing of the back electromotive force in the present invention;

FIG. 11 is a circuit diagram showing a configuration example of the rotor position detection means according to the present invention;

FIG. 12 is a diagram showing the detection timing of rotor position detection in the present invention;

FIG. 13 is a timing chart showing the signal waveform in each area of the circuit diagram in FIG. 11;

FIG. 14 is a block diagram showing the major areas of another configuration example of the rotor position detection means according to the present invention;

FIG. 15 is a circuit diagram showing a configuration example of the application voltage determination means according to the present invention;

FIG. 16 is a circuit diagram showing a configuration example of the photomos switch according to the present invention;

FIG. 17 is a graph showing the bare characteristics of the motor according to the present invention;

FIG. 18 is a graph showing the motor efficiency according to the present invention;

FIG. 19 is a graph showing the inverter efficiency according to the present invention;

FIG. 20 is a circuit diagram showing another configuration example of the first amplification means according to the present invention;

FIG. 21 is a circuit diagram showing another configuration example of the application voltage determination means according to the present invention;

FIG. 22 is a circuit diagram showing another configuration example of the application voltage determination means and the circuit nearby according to the present invention;

FIG. 23 is a diagram showing the relationship between the input/output of the comparators and flip-flop according to the present invention;

FIG. 24 is a graph showing the T-N characteristics according to the present invention;

FIG. 25 is a block diagram showing a configuration example of the drive control means according to the present invention;

FIG. 26 is a circuit diagram showing a configuration example of the chop-on detection means, open phase selection means, and edge detection means according to the present invention;

FIG. 27 is a timing chart showing the operation of the circuit shown in FIG. 26;

FIG. 28 is the truth table according to the present invention;

FIG. 29 is a block diagram showing another configuration example of the brushless DC motor drive apparatus according to the present invention;

FIG. 30 is a flow chart showing the operation of the control area during a single commutation cycle;

FIG. 31 is a block diagram showing another configuration example of the brushless DC motor drive apparatus according to the present invention;

FIG. 32 is a flow chart showing the operation of the control area during a single commutation cycle;

FIG. 33 is a circuit diagram showing another configuration example of the rotor position detection means according to the present invention;

FIG. 34 is a timing chart showing the signal waveform in each area of the circuit diagram in FIG. 33;

FIG. 35 is a timing chart showing the signal waveform in each area of the circuit diagram in FIG. 33 when spike voltage is occurring;

FIG. 36 is a block diagram showing another configuration example of the rotor position detection means according to the present invention;

FIG. 37 is a timing chart showing the signal waveform in each area of the circuit diagram in FIG. 36;

FIG. 38 is a diagram showing the timing of rotor position detection in the present invention;

FIG. 39 is a block diagram showing another configuration example of the rotor position detection means according to the present invention;

FIG. 40 is a circuit diagram showing another configuration example of the rotor position detection means according to the present invention; and FIG. 41 is a circuit diagram showing another configuration example of the rotor position detection means according to the present invention.

DESCRIPTION OF THE PREFERRED EMBODIMENTS

The brushless DC motor drive apparatus according to the present invention is explained below in detail based on the working examples described below and illustrated in the attached drawings.

Working example 1

FIG. 6 is a block diagram showing a configuration example of the brushless DC motor drive apparatus of the present invention.

As shown in this figure, the brushless DC motor drive apparatus comprises brushless DC motor (motor) 40 including stator 41 in which 3-phase armature windings (excitation coils) are connected in a star formation and rotor 42 in which pairs of magnetic poles are formed by permanent magnets, inverter 43 with a conducting interval of 120° (hereafter referred to as "inverter") that adjusts speed by means of chopper control, rotor position detection means 44 that utilizes the back electromotive force during chop-on, and drive control means 45 that controls and drives inverter 43 according to the signal output by the rotor position detection means 44.

Although either the type shown in FIG. 3 or the type shown in FIG. 4 can be used for the rotor 42, this working example uses the interior permanent magnet type exhibiting reverse saliency shown in FIG. 4.

Permanent magnets 13 and 16 preferably possess excellent magnetic characteristics such as coercive force (iHc), saturation magnetic flux density (Br), and magnetic energy product ((BH)max). Those permanent magnets that contain rare earth elements, for example, are used. The most suitable examples include rare earth magnets that contain as major components, rare earth elements such as Nd, Pr, Ce, Dy, and Sm, transition metals such as Fe and Co, and B. Sm-Co magnets can also be used.

Furthermore, such permanent magnets 13 and 16 preferably has magnetic energy product (BH)max of at least 28 MGOe, and more preferably at least 35 MGOe.

The use of such high-performance permanent magnets makes it possible to make the permanent magnet thin, which is advantageous in terms of motor performance and manufacturing particularly when the embedded magnet-type rotor shown in FIG. 4 is used.

The individual excitation coils U, V, and W of stator 41 in which 3-phase armature windings are connected in a star formation are connected to the output side of inverter 43. DC power supply Ed is applied to the input side of the inverter 43, and Ed+ and Ed− of DC power supply Ed are connected to the P and N sides of each transistor, respectively. Inverter 43 comprises P-side transistors (semiconductor switching elements) Ta+, Tb+, and Tc+ to which individual P-side reflux diodes Da+, Db+, and Dc+ are connected, and N-side transistors (semiconductor switching elements) Ta−, Tb−, and Tc− to which individual N-side reflux diodes Da−, Db−, and Dc− are connected.

As shown in FIG. 7, drive control means 45 selects two windings from the excitation coils in each phase and sequentially makes electrical connection according to excitation patterns in which a P-side transistor and an N-side transistor are combined as pair, and thus forming the rotating magnetic field of stator 41 and rotating rotor 42. Furthermore, electrical connection and disconnection (hereafter, connection will be referred to as "chop-on" and disconnection as "chop-off") are alternately repeated through PWM (Pulse Width Modulation) chopper control for either the P-side or N-side transistor of the excitation pattern, and the amount of electrical power applied and speed are adjusted by varying the duty ratio between chop-on and chop-off. In this way, terminal voltages Vu, Vv, and Vw, relative to the Ed− side of the DC power supply Ed, are obtained in the individual excitation coils U, V, and W of stator 41. Note that although either the Ed− or Ed+ side of the DC power supply Ed can be used as the reference, the Ed− side is used in this working example.

Next, these terminal voltage waveforms will be discussed. FIG. 8 is a diagram showing the relationship between back electromotive forces (back electromotive voltage) ea, eb, and ec of U phase, V phase, and W phase, respectively, and the drive signal when lead angle is 0° in brushless DC motor 40. In this case, only two of the transistors, i.e., one in a certain phase on the P side and a different one in a certain phase on the N side, are active in any phase. Therefore, two periods (two 60° intervals in terms of electrical angle), in which both the P-side and N-side transistors are inactive, exist within each cycle of the terminal voltage of each phase. Hereafter this period is referred to as an "open period" and a phase in this state, as an "open phase."

The aforementioned "lead angle" refers to the phase angle (current phase angle) formed by the current flowing through the stator armature winding (excitation coil) in relation to the q axis of the d-q coordinate system.

The terminal voltage during chop-on in an open period is discussed below. FIG. 9 is a circuit diagram showing an equivalent circuit when Ta+ and Tb− are electrically connected in the chopper control. As shown in this figure, a state is assumed in which drive signals are input into Ta+ and Th− and current i flows from Ta+ to Ta−, i.e., a chop-on in which U phase and V phase are electrically connected. Here, terminal voltage Vw of W phase which is an open phase can be expressed as described below. Note that, in FIG. 9, L is inductance, r is resistance, and Vce is collector-emitter saturation voltage.

First, the following equations can be established based on the loop in which current i flows:

$$Ed = 2(L \cdot di/dt + ri) + ea - eb + 2 \cdot Vce \qquad (6)$$

$$L \cdot di/dt + ri = Ed/2 - (ea - eb)/2 - Vce \qquad (7)$$

Then, terminal voltage Vw of W phase which is an open phase can be expressed as the following equation:

$$Vw = Vce + L \cdot di/dt + ri - eb + ec \qquad (8)$$

Substituting equation (7) into equation (8) yields the following equation:

$$Vw = Ed/2 + ec - (ea + eb)/2 \qquad (9)$$

If it is assumed that the back electromotive force has a perfectly symmetrical waveform as shown in FIG. 10, equation (9) can be rewritten as shown below since a relationship ea = −eb holds true near point P where back electromotive force ec of W phase which is an open phase becomes 0 V.

$$Vw = Ed/2 + ec \qquad (10)$$

This relationship holds true regardless of the PWM chopper control method, i.e., P-side chopper or N-side chopper, and open phase terminal voltage satisfying equation (10) can be obtained in either chopper as long as chop-on is in effect.

Furthermore, it is clear from equation (10) that open phase terminal voltage Vw changes (fluctuates up or down) from the potential that is ½ of DC power supply Ed in response to back electromotive force ec. That is, the point at which open phase terminal voltage Vw becomes Ed/2 during chop-on (the point at which ec=0) is the detection timing that is 30° ahead in terms of electrical angle from the commutation point at which lead angle is 0°.

Next, a method of detecting the point P at which back electromotive force ec of open phase terminal voltage Vw becomes 0 V is described below. In this example, when W phase is open, U-phase terminal voltage Vu and V-phase terminal voltage Vv during chop-on in the U and V phases can be expressed as follows.

$$Vu=Ed-Vce \tag{11}$$

$$Vv=0+Vce \tag{12}$$

As shown in FIG. 10 (b), V-phase terminal voltage relative to W phase is expressed as follows.

$$Vv-Vw=-ec-(Ed/2-Vce) \tag{13}$$

W-phase terminal voltage relative to U phase is expressed as follows.

$$Vw-Vu=ec-(Ed/2-Vce) \tag{14}$$

When point P of back electromotive force ec is obtained by substituting ec=0 into equations (13) and (14), Vv−Vw becomes equal to Vw−Vu at a point −(Ed/2−Vce). Normally, Vce is a small value and contained in both equations (13) and (14), and thus does not affect the detection of point P of ec.

Next, rotor position detection means 44 which utilizes the back electromotive force during the aforementioned chop-on will be explained. FIG. 11 is a circuit diagram showing a configuration example of rotor position detection means 44.

As shown in the figure, terminal voltages Vu, Vv, and Vw of the individual armature winding terminals of stator 41 are input into first line voltage generation means 50a, second line voltage generation means 50b, and third line voltage generation means 50c, respectively, and are converted to line voltages Vw-u, Vu-v, and Vv-w.

The individual line voltages are input into first amplification means 80a, second amplification means 80b, and third amplification means 80c, respectively; and the signals output from these amplification means 80a, 80b, and 80c and the signals output from line voltage generation means 50a, 50b, and 50c input into first comparison means 66a, second comparison means 66b, and third comparison means 66c. Comparison means 66a, 66b, and 66c compare these signals, detect the magnetic pole position that is 30° ahead in terms of electrical angle from the commutation point at which lead angle is 0°, and generates signals (magnetic pole position signals) Up, Vp, and Wp that correspond to the magnetic pole position of rotor 42.

These magnetic pole position signals Up, Vp, and Wp of rotor 42 are input into drive control means 45 from rotor position detection means 44, and drive control means 45 controls the drive of inverter 43 based on those magnetic pole position signals.

Next, the configuration and operation of individual line voltage generation means will be described in detail.

First line voltage generation means 50a comprises resistors 51, 52, 53, and 54, and amplifier 55.

U phase terminal voltage Vu and W phase terminal voltage Vw are input into first line voltage generation means 50a.

In other words, terminal voltage Vw is input into the + input terminal of amplifier 55 via resistor 51, terminal voltage Vu is input into the − input terminal of amplifier 55 via resistor 52, and the W phase terminal voltage relative to U phase is output.

This first line voltage generation means 50a is a differential amplifier in which resistor 53 is connected between the output terminal and the − input terminal of amplifier 55 and resistor 54 is grounded from the + input terminal of amplifier 55 to the negative side of DC power supply Ed. If the resistor values are set such that resistor 51=resistor 52=R1 and resistor 53=resistor 54=R2, output (voltage) Vw-u of first line voltage generation means 50a can be expressed as follows.

$$Vw-u=R2/R1 \cdot (Vw-Vu) \tag{15a}$$

As a result, the line voltage between W and U phases which is amplified at the amplification rate of R2/R1 is obtained.

Likewise, second line voltage generation means 50b comprises resistors 56, 57, 58, and 59, and amplifier 60.

V phase terminal voltage Vv and U phase terminal voltage Vu are input into said second line voltage generation means 50b.

In other words, terminal voltage Vu is input into the + input terminal of amplifier 60 via resistor 56, terminal voltage Vv is input into the − input terminal of amplifier 60 via resistor 57, and the U phase terminal voltage relative to V phase is output.

This second line voltage generation means 50b is a differential amplifier in which resistor 58 is connected between the output terminal and the − input terminal of amplifier 60 and resistor 59 is grounded from the + input terminal of amplifier 60 to the negative side of DC power supply Ed. If the resistor values are set such that resistor 56=resistor 57=R1 and resistor 58=resistor 59=R2, output Vu-v of second line voltage generation means 50b can be expressed as follows.

$$Vu-v=R2/R1 \cdot (Vu-Vv) \tag{15b}$$

As a result, the line voltage between U and V phases which is amplified at the amplification rate of R2/R1 is obtained.

Likewise, third line voltage generation means 50c comprises resistors 61, 62, 63, and 64, and amplifier 65.

W phase terminal voltage Vw and V phase terminal voltage Vv are input into said third line voltage generation means 50c.

In other words, terminal voltage Vv is input into the + input terminal of amplifier 65 via resistor 61, terminal voltage Vw is input into the − input terminal of amplifier 65 via resistor 62, and the V phase terminal voltage relative to W phase is output.

This third line voltage generation means 50c is a differential amplifier in which resistor 63 is connected between the output terminal and the − input terminal of amplifier 65 and resistor 64 is grounded from the + input terminal of amplifier 65 to the negative side of DC power supply Ed. If the resistor values are set such that resistor 61=resistor 62=R1 and resistor 63=resistor 64=R2, output Vv-w of third line voltage generation means 50c can be expressed as follows.

$$Vv-w=R2/R1 \cdot (Vu-Vv) \tag{15c}$$

As a result, the line voltage between V and W phases which is amplified at the amplification rate of R2/R1 is obtained.

Operational amplifiers or isolation amplifiers described in Working example 10 below, for example, can be used as said amplifiers 55, 60, and 65.

Next, the configuration and operation of individual amplifiers will be described in detail.

Output Vw-u of first line voltage generation means 50a is input into first amplification means 80a. First amplification means 80a comprises resistor 81, resistor 82, and amplifier 83. That is, first amplification means 80a is an in-phase amplifier in which the output side of first line voltage generation means 50a is connected to the + input terminal of amplifier 83 and resistor 81 is grounded from the − input terminal of amplifier 83 to the negative side of DC power supply Ed. If the resistor values are set such that resistor 81=R3 and resistor 82=R4, output Vw-u(gain) of first amplification means 80a can be expressed as follows.

$$Vw-u(gain)=(1+R4/R3)\cdot Vw-u \quad (16a)$$

As a result, a line voltage which is amplified at the amplification rate of (1+R4/R3) is obtained wherein Vw-u<Vw-u(gain).

Likewise, output Vu-v of second line voltage generation means 50b is input into second amplification means 80b. Second amplification means 80b comprises resistor 84, resistor 85, and amplifier 86. That is, second amplification means 80b is an in-phase amplifier in which the output side of the second line voltage generation means 50b is connected to the + input terminal of amplifier 86 and resistor 84 is grounded from the − input terminal of amplifier 86 to the negative side of DC power supply Ed. If the resistor values are set such that resistor 84=R3 and resistor 85=R4, output Vu-v(gain) of second amplification means 80b can be expressed as follows.

$$Vu-v(gain)=(1+R4/R3)\cdot Vu-v \quad (16b)$$

As a result, a line voltage which is amplified at the amplification rate of (1+R4/R3) is obtained wherein Vu-v<Vu-v(gain).

Likewise, output Vv-w of third line voltage generation means 50c is input into third amplification means 80b. Third amplification means 80c comprises resistor 87, resistor 88, and amplifier 89. That is, third amplification means 80c is an in-phase amplifier in which the output side of the third line voltage generation means 50c is connected to the + input terminal of amplifier 89 and resistor 87 is grounded from the − input terminal of amplifier 89 to the negative side of DC power supply Ed. If the resistor values are set such that resistor 87=R3 and resistor 88=R4, output Vv-w(gain) of third amplification means 80c can be expressed as follows.

$$Vv-w(gain)=(1+R4/R3)\cdot Vv-w \quad (16c)$$

As a result, a line voltage which is amplified at the amplification rate of (1+R4/R3) is obtained wherein Vv-w<Vv-w(gain).

Next, the operation of individual comparison means will be described in detail.

In first comparison means 66a, output Vu-v(gain) of second amplification means 80b and output Vw-u of first line voltage generation means 50a are compared, and Low voltage (low-level voltage) is output when Vu-v(gain)≧Vw-u, and High voltage (high-level voltage) is output when Vu-v(gain)<Vw-u, and thus pulse signal (magnetic pole position signal) Up is generated.

Likewise, in second comparison means 66b, output Vv-w (gain) of third amplification means 80c and output Vu-v of second line voltage generation means 50b are compared, and Low voltage (low-level voltage) is output when Vv-w(gain) ≧Vu-v, and High voltage (high-level voltage) is output when Vv-w(gain)<Vu-v, and thus pulse signal (magnetic pole position signal) Vp is generated.

Likewise, in third comparison means 66c, output Vw-u (gain) of first amplification means 80a and output Vv-w of third line voltage generation means 50c are compared, and Low voltage (low-level voltage) is output when Vw-u(gain) ≧Vv-w, and High voltage (high-level voltage) is output when Vw-u(gain)<Vv-w, and thus pulse signal (magnetic pole position signal) Vp is generated.

Note that in most cases comparators are preferably used as individual comparison means 66a, 66b, and 66c (hereafter, comparison means will be referred to as "comparator").

FIG. 12 is a diagram showing the detection timing of rotor position detection when output Vw-u of first line voltage generation means 50a and output Vu-v(gain) of second amplification means 80b, which is amplified at the amplification rate of (1+R4/R3), are compared by first comparison means 66a.

As shown in this figure, the period between point H and point J (electrical angle of 60°) is an open period. Point J at which Vu-v(gain) shows a peak indicates lead angle 1°. If lead angle θ is defined as the angle relative to this point J toward the direction of point H, lead angle θ0 determined by the intersection between Vw-u and Vu-v(gain) can be expressed as the following equation:

$$\theta=\{A/(1+A)\}\cdot 60 \quad (17)$$

where A in equation (17) indicates amplification rate. The above equation (17) demonstrates that lead angle θ is determined by amplification rate A. For example, if A=1, lead angle θ=30°, if A=2, lead angle θ=40°, and thus phase for rotor position detection can be easily advanced beyond lead angle 30° in terms of electrical angle.

In this rotor position detection, lead angle θ is set to advance preferably beyond 30° in terms of electrical angle, and more preferably beyond 40°, and even more preferably beyond 50°.

By advancing the rotor position detection phase as explained above, motor's operation range is significantly expanded, and as a result the system design freedom of brushless DC motor drive apparatuses is improved.

FIG. 13 is a timing chart showing the signal waveform in each area of the circuit diagram in FIG. 11. Note that amplification rate A of approximately 4 is used for calculating Vw-u(gain), Vu-v(gain), and Vv-w(gain) in FIG. 13.

As shown in the figure, rotor position detection means 44 generates magnetic pole position signals Up, Vp, and Wp in which lead angle θ is set to advance by 30° or more.

Optimal operation control becomes possible by shifting to the lead angle θ that matches the characteristics of the motor from these obtained signals Up, Vp, and Wp in which lead angle θ is set to advance by 30° or more (for example, by advancing the commutation timing by a specified lead angle θ).

No particular limitations exist in the shift method; and for example, it is possible to use a method in which a counter is used for counting reference pulses using the detection signal as a trigger, or a method in which a microcomputer is used for storing the desired shift in a storage means such as ROM and for adding shift volume by reading the shift corresponding to instantaneous rotation count.

It is possible to vary the shift to the optimal value that suits the motor characteristics in correspondence to rotation count only, motor current value only, or both rotation count and motor current value, etc. For example, it is possible to vary the shift in correspondence to the motor current value such that the relationship in FIG. 5 is satisfied. In any case, because rotor position detection means 44 according to the present invention can accurately advance the detection signal by 30° or more, the lead angle setting range is widened and the operation range is expanded.

Working example 2

Next, Working example 2 of the present invention will be explained with reference to the attached drawings.

FIG. 14 is a block diagram showing the major areas of another configuration example of the rotor position detection means according to the present invention.

As shown in the figure, in this rotor position detection means 44, first amplification means 80a, second amplification means 80b, and third amplification means 80c of rotor position detection means 44 of the aforementioned Working example 1 are connected to first gain switching means 90a, second gain switching means 90b, and third gain switching means 90c, respectively. These gain switching means 90a, 90b, and 90c switch gains based on output L1 of application voltage determination means 101 which detects the voltage applied to the motor, according to specified timing.

Next, the operation of application voltage determination means 101 which detects the voltage applied to the motor will be described in detail. FIG. 15 is a circuit diagram showing a configuration example of application voltage determination means 101.

Because the voltage applied to the motor is adjusted through PWM chopper control which varies the duty ratio between chop-on and chop-off of the transistor, the voltage applied to the motor in this working example is determined based on this duty ratio between chop-on and chop-off.

As shown in FIG. 15, a chopping wave or sawtooth wave possessing a chopping frequency is output from chopping waveform generation circuit 204. Command voltage V0 which determines the desired duty ratio and the output from this chopping wave generation circuit 204 are then input into comparator 205, and comparator 205 compares command voltage V0 and the output of chopping wave generation circuit 204 and outputs a rectangular wave corresponding to the desired duty ratio.

Command voltage V0 which determines the desired duty ratio is also input into comparator 208. Reference voltage V1 which sets up the switching timing of individual gain switching means 90a, 90b, and 90c is also input into comparator 208, where command voltage V0 and reference voltage V1 are compared and output signal L1 of High voltage or Low voltage is output.

Note that the method of determining the desired duty ratio in the present invention is not particularly limited to that described above, and a method which uses reference oscillator and a timer inside a microcomputer, for example, can also be used.

Next, the configuration and operation of individual gain switching means will be described in detail.

As shown in FIG. 14, in first gain switching means 90a, resistor 91 and analog switch 92 are connected in series; in second gain switching means 90b, resistor 93 and analog switch 94 are connected in series; and in third gain switching means 90c, resistor 95 and analog switch 96 are connected in series. In this case, analog switches 92, 94, and 96 are simultaneously turned on/off by output signal L1 of application voltage determination means 101 which detects the voltage applied to the motor, and turning on/off of these analog switches 92, 94, and 96 electrically connects/disconnects resistors 91, 93, and 95.

A switching element such as MOSFET possessing low ON resistance or a photomos switch shown in FIG. 16 is preferably used as analog switches 92, 94, and 96.

The photomos switch can use the light emitted by LED206 to directly switch MOSFET207 which is electrically insulated, and can trigger LED202 directly from a port of a microcomputer, etc., and thus is suitable to applications in which rotor position detection means 44 is different from the ground line such as when application voltage determination means 101 comprises a microcomputer, etc.

As shown in FIG. 14, first amplification means 80a comprises resistors 81, resistor 82, and amplifier 83. In this case, an in-phase amplifier is configured in which the output side of first line voltage generation means 50a is connected to the + input terminal of amplifier 83 and resistor 81 is grounded from the − input terminal of amplifier 83 to the negative side of DC power supply Ed, resistor 82 is connected between the output terminal and the − input terminal of amplifier 83, and resistor 91 and analog switch 92 which are connected in series are connected between the output terminal and the − input terminal of amplifier 83, in parallel with resistor 82.

Here, if the resistor values are set such that resistor 81=R3, resistor 82=R4, and resistor 91=R5, output Vw-u (gain) of first amplification means 80a can be expressed as follows.

$$Vw-u(gain)=(1+Rz/R3) \cdot Vw-u \quad (18a)$$

$$\text{where } Rz=(R4 \cdot R5)/(R4+R5) \quad (19)$$

As a result, a line voltage which is amplified at the amplification rate of (1+Rz/R3) is obtained wherein Vw-u<Vw-u(gain). Therefore, by using analog switch 92 to electrically connect/disconnect resistor 91=R5, it is possible to change combined resistance Rz of equation (19) and the amplification rate determined by (1+Rz/R3).

Likewise, second amplification means 80b comprises resistors 84, resistor 85, and amplifier 86. In this case, an in-phase amplifier is configured in which the output side of second line voltage generation means 50b is connected to the + input terminal of amplifier 86 and resistor 84 is grounded from the − input terminal of amplifier 86 to the negative side of DC power supply Ed, resistor 85 is connected between the output terminal and the − input terminal of amplifier 86, and resistor 93 and analog switch 94 which are connected in series are connected between the output terminal and the − input terminal of amplifier 86, in parallel with resistor 85.

Here, if the resistor values are set such that resistor 84=R3, resistor 85 =R4, and resistor 93=R5, output Vu-v (gain) of second amplification means 80b can be expressed as follows.

$$Vu-v(gain)=(1+Rz/R3) \cdot Vu-v \quad (18b)$$

As a result, a line voltage which is amplified at the amplification rate of (1+Rz/R3) is obtained wherein Vu-v<Vu-v(gain). Therefore, by using analog switch 94 to electrically connect/disconnect resistor 93=R5, it is possible to change combined resistance Rz of equation (19) and the amplification rate determined by (1+Rz/R3).

Likewise, third amplification means 80c comprises resistors 87, resistor 88, and amplifier 89. In this case, an in-phase amplifier is configured in which the output side of third line voltage generation means 50c is connected to the + input terminal of amplifier 89 and resistor 87 is grounded from the − input terminal of amplifier 89 to the negative side of DC power supply Ed, resistor 88 is connected between the output terminal and the − input terminal of amplifier 89, and resistor 95 and analog switch 96 which are connected in series are connected between the output terminal and the − input terminal of amplifier 89, in parallel with resistor 88.

Here, if the resistor values are set such that resistor 87=R3, resistor 88=R4, and resistor 95=R5, output Vv-w (gain) of third amplification means 80c can be expressed as follows.

$$Vv-v(\text{gain})=(1+Rz/R3)\cdot Vv-w \quad (18c)$$

As a result, a line voltage which is amplified at the amplification rate of (1+Rz/R3) is obtained wherein Vv-w<Vv-w(gain). Therefore, by using analog switch 96 to electrically connect/disconnect resistor 95=R5, it is possible to change combined resistance Rz of equation (19) and the amplification rate determined by (1+Rz/R3).

Amplification rate can also be changed in a similar manner by connecting in parallel first, second, and third gain switching means 90a, 90b, and 90c to resistors 81, 84, and 87 or first, second, and third amplification means 80a, 80b, and 80c, respectively.

In this case, output Vw-u(gain) of first amplification means 80a can be expressed as follows.

$$Vw-u(\text{gain})=(1+R4/Rz1)\cdot Vw-u \quad (20)$$

$$\text{where } Rz1=(R3\cdot R5)/(R3+R5) \quad (21)$$

As a result, a line voltage which is amplified at the amplification rate of (1+R4/Rz1) is obtained wherein Vw-u<Vw-u(gain). Therefore, by using analog switch 92 to electrically connect/disconnect resistor 91=R5, it is possible to change combined resistance Rz1 of equation (21) and the amplification rate determined by (1+R4/Rz1).

FIG. 17 is a graph showing the change in the bare characteristics of the motor when gain is varied using a brushless DC motor with an embedded magnet-type rotor possessing the characteristics shown in FIG. 15, in the configuration of the present invention.

As shown in the figure, bare characteristics S1, S2, S3, and S4 are the result of measuring angles of lead 0°, 20°, 30°, and 40°, respectively. Note that bare characteristics S1 and S2 for which lead angle is less than 30° are obtained by shifting the output of rotor position detection means 44 of the present invention. Bare characteristics S1 is obtained by adding -30° (delayed by 30°) to the fixed shift when output of rotor position detection means 44 is set at 30° lead angle.

Bare characteristics S2 is obtained by adding -10° to the fixed shift when output of rotor position detection means 44 is set at 30° lead angle.

In the experiment, output L1 of application voltage determination means 101 was manually changed to separately measure bare characteristics S3 and S4.

The result in FIG. 17 shows that the revolution speed increased by 1,500 rpm from the maximum value of 8,000 rpm at 0° lead angle to 9,500 rpm at 40° lead angle. When torque was compared at 7,800 rpm using the maximum torque at lead angle 0° as 1 (0.4 N·m), torque (1.98 N·m) which was about 5 times larger was obtained at lead angle 40°.

FIG. 18 is a graph showing the motor efficiency when lead angle θ is varied at 6,000 rpm. FIG. 19 is a graph showing the inverter efficiency when lead angle θ is varied at 6,000 rpm.

In FIG. 18, E1, E2, and E3 indicate motor efficiency when lead angle is varied from 20° to 40° at motor load torque of 1 N·m, 2 N·m, and 3 N·m, respectively.

In FIG. 19, F1, F2, and F3 indicate inverter efficiency when lead angle is varied from 20° to 40° at motor load torque of 1 N·m, 2 N·m, and 3 N·m, respectively.

These result show that motor efficiency declines by about 1.5% when lead angle θ is advanced from 20° to 40° and that inverter efficiency also declines by about 0.5%, resulting in overall efficiency decline of about 2%.

As evident from the above, in normal operation, it is preferable to consider efficiency, etc. and to operate the motor at lead angle θ that minimizes motor current per output torque at the rated point, i.e., at lead angle θ that maximizes the output torque of the motor at the rated torque. However, if it is necessary to obtain faster rotation and added torque at some point during motor operation even by sacrificing efficiency somewhat, operation range can be expanded by setting motor application voltage to switch lead angle to the advanced side.

Although the gain switching means in this working example comprise an analog switch and a resistor, it is also possible to use other methods such as a method in which an FET is used in place of the analog switch and resistor, and the resistance is continuously varied by operating the FET within its active range.

Furthermore, although motor application voltage is used for switching the gain, it is also possible to use motor rotation count or motor current for changing the gain.

Working example 3

Next, Working example 3 of the present invention will be explained with reference to the attached drawings.

FIG. 20 is a circuit diagram showing another configuration example of amplification means for one phase (first amplification means) 80a according to the present invention. Since the configurations of second and third amplification means 80b and 80c are identical to that of first amplification means 80a, their explanations are omitted.

As shown in the figure, in rotor position detection means 44 in this working example, n (where n is an integer of 2 or greater) gain switching means 901, 902 ... 90n are connected in parallel with resistor 82 of first amplification means 80a of rotor position detection means 44 in Working example 1 described above. These gain switching means 901, 902 ... 90n switch gains based on output L1, L2 ... Ln of n application voltage determination means 101, 102 ... 10n which are individual provided, according to specified timing.

Next, n application voltage determination means 101, 102 ... 10n which detect the voltage applied to the motor will be explained. FIG. 21 is a circuit diagram showing a configuration example of the application voltage determination means.

As shown in the figure, command voltage V0 which determines the desired duty ratio is input into n comparators 301, 302 ... 30n. These n comparators 301, 302 ... 30n compare command voltage V0 with n reference voltages V1, V2 ... Vn which set the switching timing of n gain switching means 901, 902 ... 90n, and output signals L1, L2 ... Ln of High voltage or Low voltage are output.

As shown in FIG. 20, in gain switching means 901, resistor 911 and analog switch 921 are connected in series. Likewise, in other gain switching means 902 ... 90n, resistors 912 ... 91n and analog switches 922 ... 92n are respectively connected in series. Analog switches 922 ... 92n are individually turned on/off by output signal L1 ... Ln of application voltage determination means 101 ... 10n which detect the voltage applied to the motor, and these on/off actions electrically connect/disconnect resistors 911 ... 91n.

Here, if the resistor values are set such that resistor 81=R3, resistor 82 =R4, and n resistors 911 ... 91n=R511 ... R51n, output Vw-u(gain) of first amplification means 80a can be expressed as follows.

$$Vw-u(\text{gain})=(1+Rz2/R3)\cdot Vw-u \quad (22)$$

$$\text{where } Rx2=1/(1/R4+1/R511+\ldots+1/R51n) \quad (23)$$

As a result, a line voltage which is amplified at the amplification rate of (1+Rz2/R3) is obtained wherein Vw-u<Vw-u(gain). Therefore, by using analog switches 921 ... 92n to electrically connect/disconnect n resistor 911 ... 91n=R511 ... R51n, it is possible to vary combined resistance Rz2 of equation (23) and to continuously vary the amplification rate determined by (1+Rz2/R3).

Amplification rate can also be varied in the same manner by connecting n gain switching means 901 ... 90n in parallel with resistor 81 of first amplification means 80a.

In this case, output Vw-u(gain) of first amplification means 80a can be expressed as follows.

$$Vw\text{-}u(\text{gain}) = (1+R4/Rz3) \cdot Vw\text{-}u \tag{24}$$

$$\text{where } Rx3 = 1/(1/R3 + 1/R511 + \ldots + 1/R51n) \tag{25}$$

As a result, a line voltage which is amplified at the amplification rate of (1+R4/Rz3) is obtained wherein Vw-u<Vw-u(gain). Therefore, by using analog switches 921 ... 92n to electrically connect/disconnect n resistor 911 ... 91n=R511 ... R51n, it is possible to vary combined resistance Rz3 of equation (25) and the amplification rate determined by (1+R4/Rz3). Note that this configuration can be combined with the configuration in FIG. 20. Such configuration makes it possible to expand motor operation range during motor operation in stages.

Working example 4

Next, Working example 4 of the present invention will be explained with reference to the attached drawings.

FIG. 22 is a circuit diagram showing another configuration example of the application voltage determination means and the circuit nearby according to the present invention.

As shown in the figure, in this working example, hysteresis circuit 110 is added to application voltage determination means 101 of Working example 2 described above.

This hysteresis circuit 110 mainly comprises comparator 402 and flip-flop 501.

Command voltage V0 which determines the desired duty ratio is input into the + input terminal of comparator 402, and reference voltage VH1 which sets hysteresis level is input into the − input terminal. Comparator 402 compares command voltage V0 with reference voltage VH1, and outputs High voltage when VH1<V0 and outputs Low voltage when VH1≧V0.

Flip-flop 501 is a D type flip-flop with preset and clear, and has independent data (D), preset (PR), clear (CL), clock (CLK) input, complementary output Q, and NOTQ.

Data (D) and clock (CLK) are input into GND and are fixed at Low voltage. Output C1 of comparator 301 of application voltage determination means 101 is input into preset (PR), output C2 of comparator 402 is input into clear (CL), and output NOTQ is input into first, second, and third gain switching means 90a, 90b, and 90c in the next stage. Individual voltages V0, V1, and VH1 are set such that V0 (max)>V1>VH1.

FIG. 23 is a diagram showing the relationship between the input/output of the comparators 301 and 401 and flip-flop 501 according to the present invention.

As shown in the figure, when command voltage V0 rises from Low level but is still lower than V1 and VH1 (state 1), the output of comparator 301 becomes High voltage (H), the output of comparator 402 becomes Low voltage (L), and output NOTQ of flip-flop 501 becomes High voltage.

Next, when command voltage V0 becomes higher than VH1 (state 2), the output of comparator 301, the output of comparator 402, and output NOTQ of flip-flop 501 all become High voltage.

Here, the gain when NOTQ is High voltage is defined as the first gain (gain before switching), and the gain when NOTQ is Low voltage is defined as the second gain (switched gain).

When command voltage V0 rises further and becomes higher than V1 and VH1 (state 3), the output of comparator 301 becomes Low voltage (L), the output of comparator 402 becomes High voltage (H), and output NOTQ of flip-flop 501 becomes Low voltage. At this point, the gain is switched to the second gain by the gain switching means in the next stage, and the operation continues at this second gain until the maximum value of V0 is reached.

Next, when voltage V0 falls from High level and becomes lower than V1 (state 4), the output of comparator 301 becomes High voltage (H), the output of comparator 402 becomes High voltage (H), and output NOTQ of flip-flop 501 is latched to Low voltage.

When voltage V0 falls further and becomes lower than V1 and VH1 (state 5), the output of comparator 301 becomes High voltage (H), the output of comparator 402 becomes Low voltage (L), and output NOTQ of flip-flop 501 becomes High voltage. At this point, the gain is switched to the first gain by the gain switching means in the next stage, and the operation continues at this first gain until the minimum value of V0 is reached.

FIG. 24 is a graph showing the T-N characteristics of this working example. Note that this graph shows a case in which reference voltage V1 for setting the switching timing of first gain switching means 90a is 90% and reference voltage VH1 for setting the hysteresis level is 80% when the maximum value of command voltage V0 is set at duty ratio of 100%, and lead angle is changed from 30° to 40° by changing amplification rate A.

In FIG. 24, A1 indicates bare characteristics of the motor at 90% duty ratio and 30° lead angle; A2 indicates bare characteristics of the motor at 90% duty ratio and 40° lead angle; A3 indicates bare characteristics of the motor at 100% duty ratio and 40° lead angle; A4 indicates bare characteristics of the motor at 80% duty ratio and 40° lead angle; and A5 indicates bare characteristics of the motor at 80% duty ratio and 30° lead angle.

As shown in the figure, when duty ratio is being increased, the motor is operated at 30° lead angle until duty ratio increases from 0% to 90%. That is, when duty ratio is less than 90%, the motor is operated in the region that is inside of A1 (on the origin side of the graph).

When duty ratio reaches 90%, lead angle switches from 30° to 40°, and the motor rotation count increases and bare characteristics shift to A2 while duty ratio stays at 90%. That is, when duty ratio is at 90%, the motor is operated along A2.

The motor is then operated at 40° lead angle while duty ratio increases from 90% to 100%. In this case, the motor is operated in the region between A2 and A3.

When duty ratio is being reduced, lead angle switching timing is changed by hysteresis circuit 110 from duty ratio of 90% during rise to 80%.

Therefore, when duty ratio is being reduced, the motor is operated at 40° lead angle until duty ratio falls from 100% to 80%. That is, when duty ratio is above 80%, the motor is operated in the region between A3 and A4.

When duty ratio reaches 80%, lead angle switches from 40° to 30°, and the motor rotation count decreases and bare characteristics shift to A5 while duty ratio stays at 80%. That is, when duty ratio is at 80%, the motor is operated along A5.

When duty ratio is between 80% and 90%, the motor is operated at 30° lead angle. In this case, the motor is operated in the region that is inside of A5 (on the origin side of the graph).

In this way, this working example makes it possible to expand operation range and to operate the motor in any expanded area by providing hysteresis to the output timing of the application voltage determination means through rise and fall of command voltage V0.

Although, in this working example, hysteresis circuit 110 is added to application voltage determination means 101 of Working example 2, the present invention is not limited to the configuration shown in the figure. For example, it is possible to add n hysteresis circuits to n application voltage determination means 101 . . .10n of Working example 3.

Working example 5

Next, Working example 5 of the present invention will be explained with reference to the attached drawings.

FIG. 25 is a block diagram showing a configuration example of drive control means 45 of the brushless DC motor drive apparatus according to the present invention.

As shown in the figure, drive control means 45 comprises inverter drive circuit 8 which drives inverter 43, output pattern generation circuit 9 which outputs a drive signal pattern for brushless DC motor 40 according to the detection timing of rotor position detection means 44, PWM chopper control circuit (PWM generation circuit) 10 for outputting PWM signal P1 which sets chop-on/chop-off rate of PWM chopper control according to rotation count command 11 (chop-on/chop-off rate is variable), chop-on detection means 71, open phase selection means 72, and edge detection means 73.

Open phase selection means 72 selects the open phase of the output of chop-on detection means 71, synchronously with the current drive signal pattern output of output pattern generation circuit 9.

Edge detection means 73 holds (detects) the edge at a necessary point in output (open phase signal) P2 of this open phase selection means 72. Output (detection signal) P4 of this edge detection means 73 and output (PWM signal) P1 of PWM control circuit 10 are individually input into output pattern generation circuit 9.

Then, the next drive signal pattern is input from output pattern generation circuit 9 into inverter drive circuit 8, and inverter drive circuit 8 drives transistors Ta+, Tb+, Tc+, Ta−, Tb−, and Tc− of inverter 43 based on the drive signal pattern.

FIG. 26 is a circuit diagram showing a configuration example of chop-on detection means 71, open phase selection means 72, and edge detection means 73. FIG. 27 is a timing chart showing the operation of the circuit shown in FIG. 26.

As shown in these figures, chop-on detection means 71 comprises insulating couplers 70a, 70b, and 70c for converting output Up, Vp, and Wp of rotor position detection means 44 into detection signals Ups, Vps, and Wps which are insulated from DC power supply Ed; AND gate 100 including three AND circuits 101, 102, and 103; and EX-OR gate 110 including three EX-OR circuits 111, 112, and 113. The detection signals Ups, Vps, and Wps and the PWM signal P1 are input into AND gate 100. AND gate 100 outputs data signals (pulse signals) Ups+, Vps+, and Wps+ as the signal components of the chop-on period of PWM signal P1. Their logical expressions (26a), (26b), and (26c) are as shown below.

$$Ups+ = Ups \cdot P1 \quad (26a)$$

$$Vps+ = Vps \cdot P1 \quad (26b)$$

$$Wps+ = Wps \cdot P1 \quad (26c)$$

The data signals Ups+, Vps+, and Wps+ and the PWM signal P1 are input into EX-OR gate 110. EX-OR gate 110 outputs data signals Ups−, Vps−, and Wps− as the signal components of the chop-on periods that are each 180° delayed in phase in terms of electrical angle from signal components Ups+, Vps+, and Wps+ of the chop-on period of the PWM signal P1. Their logical expressions (27a), (27b), and (27c) are as shown below.

$$Ups- = NOT(Ups+) \cdot P1 + Ups+ \cdot NOT(P1) \quad (27a)$$

$$Vps- = NOT(Vps+) \cdot P1 + Vps+ \cdot NOT(P1) \quad (27b)$$

$$Wps- = NOT(Wps+) \cdot P1 + Wps+ \cdot NOT(P1) \quad (27c)$$

where NOT (Ups+), NOT (Vps+), NOT (Wps+), and NOT (P1) indicate negation of Ups+, Vps+, Wps+, and P1, respectively.

These data signals Ups+, Vps+, Wps+, Ups−, Vps−, and Wps− are signals that correspond to the back electromotive force and spike voltage that appear during the chop-on period.

Open phase selection means 72 comprises data selector 121; AND gate 200 including three AND circuits 201, 202, and 203; and OR gate 210.

Data signals Ups+, Vps+, Wps+, Ups−, Vps−, and Wps− are input into data selector 121 as data signals.

On the other hand, this open phase selection means 72 generates open phase selection signals S1, S2, and S3 based on drive signal patterns Tad+, Tbd+, Tcd+, Tad−, Tbd−, and Tcd− which are output by output pattern generation circuit 9.

In this case, drive signal patterns Tad+, Tbd+, Tcd+, Tad−, Tbd−, and Tcd− which are output by output pattern generation circuit 9 are input into AND gate 200, and this AND gate 200 generates signals K1, K2, and K3. These signals K1, K2, and K3 are input into OR gate 210, and OR gate 210 generates open phase selection signal S1. Drive signal patterns Tbd+ and Tcd+ are used as open phase selection signal S2 and S3, respectively. The logical expressions of K1, K2, K3, and Si are (28a), (28b), (29c), and (29) as shown below.

$$K1 = Tad+ \cdot Tcd- \quad (28a)$$

$$K2 = Tbd+ \cdot Tad- \quad (28a)$$

$$K3 = Tcd+ \cdot Tbd- \quad (28a)$$

$$S1 = K1+K2+K3 \quad (29)$$

These open phase selection signals S1, S2, and S3 are input into data selector 121, and data selector 121 selects only the open periods of the data signals Ups+, Vps+, Wps+, Ups−, Vps−, and Wps− according to the truth table shown in FIG. 28, and outputs open phase signal P2. This open phase signal P2 is input into edge detection means 73.

Edge detection means 73 mainly comprises mono-multi vibrator 311 and mono-multi vibrator 312.

The open phase signal P2 is first input into mono-multi vibrator 311. Mono-multi vibrator 311 is triggered synchronously with the edge (rising edge) of the first pulse of open phase signal P2, and is then retriggered synchronously with the edges of pulses that are sequentially input. This process outputs pulse signal P3 possessing a pulse width determined by external resistor R1 and time constant t1 of external capacitor C1.

The output of this mono-multi vibrator 311, i.e., pulse signal P3, is input into mono-multi vibrator 312. Mono-multi vibrator 311 is triggered synchronously with the edge of the first pulse of open phase signal P3, and this process outputs pulse signal (detection signal) P4 possessing a pulse width determined by external resistor R2 and time constant t1 of external capacitor C2.

Here, open phase signal P2 is detected as a signal that is synchronized to the ON period of the chopping cycle of the PWM signal P1. Open phase signal P2 contains a detected edge and an edge caused by the spike voltage. This spike voltage also appears synchronously with the ON period of the chopping cycle, and its time width and pulse edge increase within the ON period of the chopping cycle as the motor current is increased by load operation of the brushless DC motor.

Since the generation timing of this spike voltage matches the commutation timing, a time difference that is equal to or shorter than the chopping cycle exists in the generation times of the detected edge and the edge caused by the spike voltage that are adjacent to each other. Therefore, mono-multi vibrator 311 performs waveform shaping such that open phase signal P2 possesses pulse width of time constant t1. Time constant t1 of mono-multi vibrator 311 is preferably set such that the condition indicated by equation (30) is met.

$$1.5T < t1(=C1 \cdot R1) < 2.0T \tag{30}$$

where T indicates chopping cycle T (T=1/fc) determined by chopping frequency fc of PWM signal P1.

Pulse signal P3 is obtained as a result. The rising edge of this pulse signal P3 corresponds to rotor position detection signal at which lead angle θ has advanced by 30° or more.

If commutation occurs after detection position at which lead angle θ has advanced by 30° is shifted by 30°, the period between the rising and falling edges of pulse signal P3 (pulse width of pulse signal P3) is determined by the detected edge that is advanced by 30° and the spike voltage that appears in the reflux mode after the commutation.

Mono-multi vibrator 312 detects only the rising edge of pulse signal P3, and outputs detection signal P4 of the pulse width determined by time constant t2.

As a result, only the rising edge of the first pulse of open phase signal P2, i.e., the first detected edge only, is detected, and rotor position detection signal that is advanced by at least 30°, i.e., detection signal P4, is always accurately obtained regardless of the load size during the operation of the brushless DC motor.

As explained above, in this working example, rotor magnetic pole position can be appropriately and accurately detected even when the output of rotor position detection means 44 contains the spike voltage that appears in the reflux mode after commutation, in addition to the rotor magnetic pole position signal to be detected, and thus normal operation can always be performed.

Note that although logical elements are used for selecting the open phases in this working example, the present invention is not limited to the configuration shown in the figure. For example, when a microcomputer is used, the open phase is uniquely determined by the drive signal pattern that is output. Therefore, it is possible to use a configuration in which open phase selection signal is output simultaneously with the drive signal output, and in which data selector 121 selects only the open periods of Ups+, Vps+, Wps+, Ups-, Vps-, and Wps- and outputs open phase signal P2, based on said open phase selection signal.

It is also possible to use a configuration in which said data signal is directly fetched into a microcomputer which performs all of the necessary processing.

Working example 6

Next, Working example 6 of the present invention will be explained with reference to the attached drawings.

FIG. 29 is a block diagram showing another configuration example of the brushless DC motor drive apparatus according to the present invention. Explanations for the areas in FIG. 29 that are identical to those in Working example 5 are omitted, and only different areas are explained.

As shown in the figure, in the brushless DC motor drive apparatus according to this working example, the revolution speed of brushless DC motor 40 is detected from the detection signal generated based on magnetic pole position signals Up, Vp, and Wp from rotor position detection means 44, and high-efficiency, wide-range operation is achieved by setting an appropriate phase shift based on this rotation count.

In this working example, control unit 400 is connected to the output side of edge detection means 73, and output pattern generation circuit 9 is connected to the output side of control unit 400. In this case, aforementioned detection signal P4 is input from edge detection means 73 into control unit 400, and control unit 400 controls the operation of output pattern generation circuit 9 based on this detection signal P4.

This control unit 400 comprises, for example, A/D converter for converting each input signal into digital signal, I/O port, timer/counter (timer), and a microcomputer equipped with a CPU and memory such as ROM and EEPROM, and sets an appropriate phase shift based on detection signal P4 from edge detection means 73, etc.

In this case, the commutation signal is output at the timing that is determined by the finally corrected phase shift from control unit 400; and next drive signal patterns Tad+, Tbd+, Tcd+, Tad-, Tbd-, and Tcd- are output by output pattern generation circuit 9 based on this commutation signal. That is, this control unit 400 achieves the major functions of a shift setting means for setting a phase shift and a commutation control means for controlling commutation.

More specifically, when a brushless DC motor possessing a surface magnet type rotor structure is being driven (id=0 control), detection point (detection timing) by rotor position detection means 44 can be set to be 30° advanced in terms of electrical angle and control unit 400 is used to shift (delay) the angle by 30°, for example. In this way, the motor can be driven (commutated) always at 0° lead angle.

In order to expand the operational range of a brushless DC motor possessing an embedded type rotor structure in high-rotation areas (weakening field control), the step described below can be taken, for example.

Detection point by rotor position detection means 44 is set to be 40° advanced in terms of electrical angle and control unit 400 shifts the angle by a specified amount in low to medium rotation areas, to operate the motor at a position at which lead angle is 20° advanced, for example, and at high efficiency by utilizing the reluctance torque. On the other hand, in the high-rotation area, control unit 400 shifts the angle by a specified amount in correspondence to the revolution speed. In this way, the operation range is expanded up to shift 0, i.e., the position at which lead angle is advanced by at least 40°.

The phase shift (shift) in the low to medium rotation areas should really be determined based on motor current or load torque. However, in this working example, phase shift is set in low to medium rotation areas which produce excellent efficiency at the rated load.

Next, commutation timing control in the drive control of brushless DC motor 40 is explained.

FIG. 30 is a flow chart showing the operation of control unit 400 during a single commutation cycle. The explanations below are based on this flow chart.

First, the revolution speed of brushless DC motor 40 (rotation count of rotor 42) is measured from detection signal P4 generated based on magnetic pole position signals Up, Vp, and Wp from rotor position detection means 44, and that rotation count is loaded (step S101).

In this step s101, the spacing between two adjacent detection signals P4, i.e., the time between the rising edge of one detection signals P4 and the rising edge of the next detection signals P4, is measured, and the revolution speed of brushless DC motor 40 is measured based on that measurement.

Next, based on this rotation count, phase shift data is fetched from the memory located inside control area 400 (step S102).

In this case, tabulated phase shift data corresponding to rotation counts, collected in advance through experiments, etc., is stored in the memory, and appropriate phase shift data corresponding to a rotation count is fetched from this memory in this step S102. Note that the phase shift data is stored as data that has been converted to time.

Next, time is set in the timer based on the fetched phase shift (step S103).

Next, timer counting is started (step S104).

Next, whether or not the time in the timer has elapsed (time-up) is checked (step S105).

If it is determined that the time in the timer has not elapsed in the step S105, the process returns to step S104 and timer counting continues (step S104), and whether or not the time in the timer has elapsed is checked (step S105) again.

If it is determined that the time in the timer has elapsed in the step S105, a commutation signal is output (step S106).

This completes the program (control operation) for a single commutation cycle.

As explained above, because the detection point by rotor position detection means 44 can be set to advance by at least 30° in terms of electrical angle in this working example, the operational range of brushless DC motor 40 is expanded.

Furthermore, because control area 400 can shift (delay) the commutation point by a specified angle, the operational efficiency in low to medium rotation areas can be improved.

Because phase shift (i.e., time by which commutation is delayed) can be automatically set according to the revolution speed, more precise operation control can be performed easily and accurately.

Although control area 400 in this working example mainly performs fetching of rotation count, storage of phase shift data, and timer counting, etc., it is possible to configure control area 400 in the present invention such that control area 400 performs all operations in a batch, including the operation of PWM control circuit 10 and output pattern generation circuit 9, fetching of rotation count command 11, and processing of other digital signals.

Working example 7

Next, Working example 7 of the present invention will be explained with reference to the attached drawings.

FIG. 31 is a block diagram showing another configuration example of the brushless DC motor drive apparatus according to the present invention. Explanations for the areas that are identical to those in Working example 6 are omitted, and only differences are explained.

As shown in the figure, the brushless DC motor drive apparatus according to this working example is provided with current detection means 401 for detecting motor current, in addition to the configuration in said Working example 6. In this case, motor current is detected by current detection means 401, and the motor current detection value (motor current value) is input from current detection means 401 into control unit 400.

Next, the control of commutation timing in the drive control of brushless DC motor 40 is explained.

FIG. 32 is a flow chart showing the operation of control unit 400 during a single commutation cycle. The explanation below is based on this flow chart.

First, the revolution speed of brushless DC motor 40 (rotation count of rotor 42) is measured from detection signal P4 generated based on magnetic pole position signals Up, Vp, and Wp from rotor position detection means 44, and that rotation count is loaded (step P101).

In this step P101, the spacing between two adjacent detection signals P4, i.e., the time between the rising edge of one detection signals P4 and the rising edge of the next detection signals P4, is measured, and the revolution speed of brushless DC motor 40 is measured based on that measurement.

Next, motor current value is loaded (step P102).

Next, based on said rotation count and motor current value, phase shift data is fetched from the memory located inside control unit 400 (step P103).

In this case, tabulated phase shift data corresponding to rotation counts and motor current values, collected in advance through experiments, etc., is stored in the memory, and appropriate phase shift data corresponding to a rotation count and motor current value is fetched from this memory in this step P103. Note that the phase shift data is stored as data that has been converted to time.

Next, time is set in the timer based on the fetched phase shift (step P104).

Next, timer counting is started (step P105).

Next, whether or not the time in the timer has elapsed (time-up) is checked (step P106).

If it is determined that the time in the timer has not elapsed in the step P106, the process returns to step P105 and timer counting continues (step P105), and whether or not the time in the timer has elapsed is checked (step P106) again.

If it is determined that the time in the timer has elapsed in said step P106, a commutation signal is output (step P107).

This completes the program (control operation) for a single commutation cycle.

As explained above, because the detection point by rotor position detection means 44 can be set to advance by at least 30° in terms of electrical angle in this working example as in Working example 6, the operational range of brushless DC motor 40 is expanded. Furthermore, because control unit 400 can shift (delay) the commutation point by a specified angle, the operational efficiency in low to medium rotation areas can be improved.

Because phase shift (i.e., time by which commutation is delayed) can be automatically set according to the revolution speed in this working example, more precise operation control can be performed easily and accurately.

Therefore, the operational range in the high rotation area is expanded, and the operational efficiency in the low to medium rotation areas is improved. Additionally, high-efficiency operation becomes possible over the entire operational range (when weakening field operation is not performed). These effects are more pronounced in the case of motors possessing an embedded type rotor structure, and thus are more advantageous.

Although control unit 400 in this working example mainly performs fetching of rotation count, storage of phase shift data, timer counting, motor current fetching (A/D conversion) etc., it is possible to configure control unit 400 in the present invention such that control unit 400 performs all operations in a batch, including the operation of PWM control circuit 10 and output pattern generation circuit 9, fetching of rotation count command 11, and processing of other digital signals.

Working example 8

Next, Working example 8 of the present invention will be explained with reference to the attached drawings.

FIG. 33 is a circuit diagram showing another configuration example of the rotor position detection means of the brushless DC motor drive apparatus according to the present invention.

As shown in the figure, the rotor position detection means in this working example is nearly identical to rotor position detection means 44 in Working example 1, except that first amplification means 80a, second amplification means 80b, and third amplification means 80c have been removed.

In this case, operational amplifiers, for example, can be used as the individual amplifiers 55, 60, and 65 of first through third line voltage generation means 50a through 50c. Operational amplifiers possess the advantages of superior low offset, low-temperature drift, and common-mode rejection ratio. Furthermore, the use of operational amplifiers results in a low-cost circuit configuration.

Terminal voltages Vu, Vv, and Vw of the individual armature winding terminals of stator 41 are input into first line voltage generation means 50a, second line voltage generation means 50b, and third line voltage generation means 50c, respectively, and are converted into line voltage Vw-u, Vu-v, and Vv-w.

The individual line voltages are input into comparison means, i.e., first comparison means 66a, second comparison means 66b, and third comparison means 66c, respectively.

Comparison means 66a, 66b, and 66c directly compare these line voltages, detect the magnetic pole position at which rotor 42 is advanced by 30° in terms of electrical angle from the commutation point of 0° lead angle, and generate magnetic pole position signals Up, Vp, and Wp.

FIG. 34 is a timing chart showing the signal waveform in each area of the circuit in FIG. 33.

As shown in the figure, first comparison means 66a compares output Vu-v of second amplification means 80b with output Vw-u of first line voltage generation means 50a, and outputs Low voltage when Vu-v≧Vw-u, and High voltage when Vu-v<Vw-u; and magnetic pole signal Up is thus generated.

Likewise, second comparison means 66b compares output Vv-w of third amplification means 80c with output Vu-v of second line voltage generation means 50b, and outputs Low voltage when Vv-w≧Vu-v, and High voltage when Vv-w<Vu-v; and magnetic pole signal Vp is thus generated.

Likewise, third comparison means 66c compares output Vw-u of first amplification means 80a with output Vv-w of third line voltage generation means 50c, and outputs Low voltage when Vw-u≧Vv-w, and High voltage when Vw-u<Vv-w; and magnetic pole signal Wp is thus generated.

These magnetic pole position signals Up, Vp, and Wp are input from the rotor position detection means into drive control means 45, as in Working example 1 described above, and drive control means 45 controls the drive of inverter 43 based on these magnetic pole position signals.

As explained above, this working example converts the terminal voltages of armature winding terminals of stator 41 into line voltages between individual phases during PWM chopper control, and directly compares these line voltages without going through a primary delay filter. In this way, the magnetic pole position at which rotor 42 is advanced by 30° in terms of electrical angle from the commutation point of 0° lead angle can be accurately and reliably detected.

Note that the signals output from the position detection means may contain signals caused by spike voltage, in addition to magnetic pole position signals Up, Vp, and Wp. This spike voltage appears in the reflux mode after commutation.

FIG. 35 is a timing chart showing the signal waveform in each area of the circuit in FIG. 33, and shows a case in which the signals output from position detection means contain signals caused by spike voltage, in addition to magnetic pole position signals Up, Vp, and Wp.

As shown in the figure, even if the signals output from the position detection means contain signals caused by spike voltage, in addition to magnetic pole position signals Up, Vp, and Wp, the operation of drive control means 45 makes it possible to detect only magnetic pole position signals Up, Vp, and Wp out of the signals output by the position detection means, as in Working example 5 described above. Consequently, the magnetic pole position of rotor 42 can always be accurately and reliably detected and accurate detection signal P4 can be obtained, regardless of whether or not spike voltage is present.

Working example 9

Next, Working example 9 of the present invention will be explained with reference to the attached drawings.

FIG. 36 is a block diagram showing another configuration example of the rotor position detection means of the brushless DC motor drive apparatus according to the present invention.

As shown in the figure, the rotor position detection means in this working example is nearly identical to rotor position detection means 44 in Working example 1 described above, except that the wiring of first through third comparison means 66a through 66c is different.

Terminal voltages Vu, Vv, and Vw of the individual armature winding terminals of stator 41 are input into first line voltage generation means 50a, second line voltage generation means 50b, and third line voltage generation means 50c, respectively, and are converted into line voltage Vw-u, Vu-v, and Vv-w.

The individual line voltages are input into first amplification means 80a, second amplification means 80b, and third amplification means 80c, respectively; and the signals from these amplification means 80a, 80b, and 80c and the signals from the line voltage generation means 50a, 50b, and 50c are input into first comparison means 66a, second comparison means 66b, and third comparison means 66c, respectively. Comparison means 66a, 66b, and 66c directly compare these signals, detect the magnetic pole position at which rotor 42 is advanced by 30° in terms of electrical angle from the commutation point of 0° lead angle, and generate magnetic pole position signals Up, Vp, and Wp.

FIG. 37 is a timing chart showing the signal waveform in each area of the circuit in FIG. 36. In FIG. 37, Vw-u(gain), Vu-v(gain), and Vv-w(gain) indicate a case in which amplification rate A is set at approximately 4.

As shown in the figure, first comparison means 66a compares output Vu-v of second amplification means 80b with output Vw-u(gain) of first line voltage generation means 50a, and outputs Low voltage when Vu-v≧Vw-u(gain), and High voltage when Vu-v<Vw-u(gain); and magnetic pole signal Up is thus generated.

Likewise, second comparison means 66b compares output Vv-w of third amplification means 80c with output Vu-v(gain) of second line voltage generation means 50b, and outputs Low voltage when Vv-w≧Vu-v(gain), and High voltage when Vv-w<Vu-v(gain); and magnetic pole signal Vp is thus generated.

Likewise, third comparison means 66c compares output Vw-u of first amplification means 80a with output Vv-w(gain) of third line voltage generation means 50c, and outputs Low voltage when Vw-u≧Vv-w(gain), and High voltage when Vw-u<Vv-w(gain); and magnetic pole signal Wp is thus generated.

These magnetic pole position signals Up, Vp, and Wp are input from the rotor position detection means into drive control means 45, as in Working example 1 described above, and drive control means 45 controls the drive of inverter 43 based on these magnetic pole position signals.

FIG. 38 is a diagram showing the timing of rotor position detection when first comparison means 66a is used to compare output Vu-v of second amplification means 80b with output Vw-u(gain) of first line voltage generation means 50a, which has been amplified at an amplification rate of (1+R4/R3).

As shown in the figure, period between point H and point J (electrical angle of 60°) is an open phase. Point J at which Vu-v(gain) shows a peak indicates lead angle 0°. If lead angle θ is defined as the angle relative to this point J toward the direction of point H, lead angle θ determined by the intersection between Vw-u(gain) and Vu-v can be expressed as the following equation:

$$\theta = |1-\{A/(1+A)\}| \cdot 60 \tag{31}$$

where A in equation (31) indicates amplification rate. The above equation (31) demonstrates that lead angle θ is determined by amplification rate A. For example, if A=1, lead angle θ=30°, if A=2, lead angle θ=20°, and thus phase for rotor position detection can be easily delayed by a specified angle from lead angle 30° in terms of electrical angle. In other words, the rotor position detection phase can be advanced to less than 30° lead angle in terms of electrical angle.

Working example 10

Next, Working example 10 of the present invention will be explained with reference to the attached drawings.

FIG. 39 is a block diagram showing a configuration example of the rotor position detection means of the brushless DC motor drive apparatus according to the present invention.

As shown in the figure, in the rotor position detection means in this working example, first line voltage generation means 50a, second line voltage generation means 50b, and third line voltage generation means 50c of the rotor position detection means in Working example 8 described above have been changed to comprise isolation amplifiers.

First line voltage generation means 50a comprise resistor 600, resistor 601, and isolation amplifier 602. This first line voltage generation means 50a is a differential amplifier.

U phase terminal voltage Vu and W phase terminal voltage Vw are input into this first line voltage generation means 50a. That is, terminal voltage Vw is input into the + input terminal of isolation amplifier 602 via resistor 600, and terminal voltage Vu is input into the – input terminal of isolation amplifier 602 via resistor 601.

W phase terminal voltage relative to U phase is then output from the output terminal of isolation amplifier 602.

If resistor 600=resistor 601, and the amplification rate of isolation amplifier 602 is set at A, output Vw-u of first line voltage generation means 50a can be expressed as the following equation:

$$V_{w-u} = A19 \cdot (V_w - V_u) \tag{32a}$$

As a result, live voltage between W phase and U phase, that is multiplied by amplification rate A, is obtained.

Likewise, second line voltage generation means 50b comprise resistor 603, resistor 604, and isolation amplifier 605. This second line voltage generation means 50b is a differential amplifier.

V phase terminal voltage Vv and U phase terminal voltage Vu are input into this second line voltage generation means 50b. That is, terminal voltage Vu is input into the + input terminal of isolation amplifier 605 via resistor 603, and terminal voltage Vv is input into the – input terminal of isolation amplifier 605 via resistor 604.

U phase terminal voltage relative to V phase is then output from the output terminal of isolation amplifier 605.

If resistor 603=resistor 604, and the amplification rate of isolation amplifier 605 is set at A, output Vu-v of second line voltage generation means 50b can be expressed as the following equation:

$$V_{u-v} = A \cdot (V_u - V_v) \tag{32b}$$

As a result, live voltage between U phase and V phase, that is multiplied by amplification rate A, is obtained.

Likewise, third line voltage generation means 50c comprise resistor 606, resistor 607, and isolation amplifier 608. This third line voltage generation means 50c is a differential amplifier.

W phase terminal voltage Vw and V phase terminal voltage Vv are input into this third line voltage generation means 50c. That is, terminal voltage Vv is input into the + input terminal of isolation amplifier 608 via resistor 606, and terminal voltage Vw is input into the – input terminal of isolation amplifier 608 via resistor 607.

V phase terminal voltage relative to W phase is then output from the output terminal of isolation amplifier 608.

If resistor 606=resistor 607, and the amplification rate of isolation amplifier 608 is set at A, output Vv-w of third line voltage generation means 50c can be expressed as the following equation:

$$V_{v-w} = A \cdot (V_v - V_w) \tag{32c}$$

As a result, live voltage between V phase and W phase, that is multiplied by amplification rate A, is obtained.

By using such a configuration, i.e., by using isolation amplifiers, DC power supply Ed side and drive control means 45 side on the subsequent stage can be electrically isolated. This configuration can reliably protect drive control means 45 which is a weak electrical system from disturbance elements such as voltage fluctuations on the DC power supply Ed side which is a strong electrical system and noise, regardless of whether or not individual insulation couplers 70a, 70b, and 70c are provided for drive control means 45. Furthermore, drive control means 45 can process signals without being affected by said disturbance elements.

Note that isolation amplifiers are high in common mode elimination capability and are ideal for isolating analog signals.

Working example 11

Next, Working example 11 of the present invention will be explained with reference to the attached drawings.

FIG. 40 is a circuit diagram showing a configuration example of the rotor position detection means of the brushless DC motor drive apparatus according to the present invention.

As shown in the figure, in the rotor position detection means in this working example, third line voltage generation means 50c of the rotor position detection means in Working example 8 described above has been changed to third line voltage generation means 50d.

This third line voltage generation means 50d generates third line voltage, i.e., line voltage Vv-w, based on first line voltage, i.e., line voltage Vw-u and second line voltage, i.e., line voltage Vu-v.

Third line voltage generation means 50d comprises resistors 609, 610, 611, and 612, and amplifier 65.

This third line voltage generation means 50d is a summing amplifier in which resistor 611 is connected between the output terminal and the − input terminal of amplifier 65, resistor 612 is grounded from the + input terminal of amplifier 65 to the negative side of DC power supply Ed.

Line voltage Vw-u and Vu-v are input into this third line voltage generation means 50d.

Line voltage Vw-u is input into the − input terminal of amplifier 65 via resistor 609, and line voltage Vu-v is input into the − input terminal of amplifier 65 via resistor 610. V phase terminal voltage relative to W phase is then output from the output terminal of amplifier 65.

If resistor values are set such that resistor 609=resistor 610=R5, output Vv-w of third line voltage generation means 50d can be expressed as follows.

$$Vv-w = -R6/R5 \cdot \{(Vu-v)\} \tag{33}$$

As a result, live voltage between V phase and W phase, that is multiplied by the amplification rate determined by R6/R5 ratio, is obtained. Line voltage Vv-w is equivalent to line voltage Vv-w in Working example 8 described above.

Note that this working example is configured such that line voltage Vv-w is generated based on line voltage Vw-u and line voltage Vu-v. However, the present invention is not limited to such a configuration, and line voltage Vu-v can be generated based on line voltage Vw-u and line voltage Vv-w, or Vw-u can be generated based on line voltage Vv-w and line voltage Vu-v.

Working example 12

Next, Working example 12 of the present invention will be explained with reference to the attached drawings.

FIG. 41 is a circuit diagram showing a configuration example of the rotor position detection means of the brushless DC motor drive apparatus according to the present invention.

As shown in the figure, in the rotor position detection means in this working example, first line voltage generation means 50a and second line voltage generation means 50b of the rotor position detection means in Working example 11 described above have been changed to comprise isolation amplifiers.

In this case, first line voltage generation means 50a and second line voltage generation means 50b are identical to first line voltage generation means 50a and second line voltage generation means 50b in Working example 11 described above, respectively, in terms of configuration, and thus their explanations are omitted.

As explained above, isolation amplifiers and operational amplifiers are combined in this working example, and thus insulation couplers 70a, 70b, and 70c can be omitted and one of the isolation amplifiers, which are more expensive than operational amplifiers, can be eliminated.

Note that this working example is configured such that line voltage Vv-w is generated based on line voltage Vw-u and line voltage Vu-v. However, the present invention is not limited to such a configuration, and line voltage Vu-v can be generated based on line voltage Vw-u and line voltage Vv-w. In such a case, isolation amplifiers are used as first line voltage generation means 50a and third line voltage generation means 50c. Alternatively, Vw-u can be generated based on line voltage Vv-w and line voltage Vu-v. In such a case, isolation amplifiers are used as second line voltage generation means 50b and third line voltage generation means 50c.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A brushless DC motor drive apparatus, comprising:
   a motor including:
      a stator including multi-phase armature windings which are connected in a star formation and generate a plurality of terminal voltages at respective terminals of the armature windings, and
      a rotor including a plurality of permanent magnets which form pairs of magnetic poles;
   an inverter, coupled to said stator, for adjusting a speed of said rotor;
   rotor position detection means for detecting the terminal voltages generated in said armature windings and for generating a position signal indicative of a magnetic pole position of said rotor, said rotor position detection means including line voltage generation means for generating line voltages corresponding to the terminal voltages of said armature windings and comparison means for comparing each one of said line voltages to an amplification of another predetermined one of said line voltages and outputting comparison signals as the position signal; and
   drive control means for controlling and driving said inverter according to the position signal generated by said rotor position detection means, said drive control means including PWM (Pulse Width Modulation) chopper control means for generating a PWM chopper control signal to control said inverter.

2. The brushless DC motor drive apparatus of claim 1 wherein said drive control means further includes:
   chop-on detection means for detecting the comparison signals from said comparison means of said rotor position detection means synchronously with a chop-on timing of the PWM chopper control signal from said PWM chopper control means and generating data signals;
   open phase selection means for selecting an open phase signal from among the data signals output by said chop-on detection means during an open phase; and
   edge-detection means for detecting predetermined edges of the open phase signal output by said open phase selection means.

3. The brushless DC motor drive apparatus of claim 1 wherein said drive control means further includes commutation control means for supplying a commutation signal after said rotor position detection means detects a predetermined magnetic pole position of said rotor and said rotor rotates by a predetermined phase shift.

4. The brushless DC motor drive apparatus of claim 1 wherein said drive control means further includes commutation control means for supplying a commutation signal synchronously with detection of a predetermined magnetic pole position of said rotor by said rotor position detection means.

5. The brushless DC motor drive apparatus of claim 1 wherein said drive control means further includes commutation control means for supplying a commutation signal after said rotor position detection means detects a predetermined magnetic pole position of said rotor and said rotor rotates by a predetermined phase shift.

6. The brushless DC motor drive apparatus of claim 1 wherein a phase angle of a current flowing through said stator armature windings relative to a q axis in a d-q coordinate system is defined as current phase angle θ, and said rotor position detection means detects a predetermined magnetic pole position of said rotor when said current phase angle θ advances by an electrical angle of not more than 30°.

7. The brushless DC motor drive apparatus of claim 1 wherein said line voltage generation means includes an isolation amplifier.

8. The brushless DC motor drive apparatus of claim 1 wherein said line voltage generation means includes:
 first line voltage generation means for generating a first line voltage,
 second line voltage generation means for generating a second line voltage, and
 third line voltage generation means for generating a third line voltage based on the first line voltage and the second line voltage.

9. The brushless DC motor drive apparatus of claim 8 wherein said first line voltage generation means and said second line voltage generation means each include an isolation amplifier.

10. A brushless DC motor drive apparatus, comprising:
 a motor including:
  a stator including 3-phase armature windings U, V, and W which are connected in a star formation and generate a plurality of terminal voltages at respective terminals of the armature windings, and
  a rotor including a plurality of permanent magnets which form pairs of magnetic poles;
 an inverter with a conducting interval of 120°, coupled to said stator, for adjusting a speed of said rotor;
 rotor position detection means for detecting the terminal voltages generated in said stator armature windings and for generating a position signal indicative of a magnetic pole position of said rotor, said rotor position detection means including:
  line voltage generation means for generating line voltages corresponding to the terminal voltages of said armature windings,
  amplification means for amplifying the line voltages and outputting amplified signals, and
  comparison means for comparing the line voltages and the amplified signals according to predetermined combinations and outputting comparison signals as the position signal; and
 drive control means for controlling and driving said inverter according to the position signal generated by said rotor position detection means, said drive control means including PWM (Pulse Width Modulation) chopper control means for generating a PWM chopper control signal to control said inverter;
 wherein said line voltage generation means of said rotor position detection means comprises:
  first line voltage generation means for generating a line voltage Vw-u between armature windings W and U,
  second line voltage generation means for generating a line voltage Vu-v between armature windings U and V, and
  third line voltage generation means for generating a line voltage Vv-w between armature windings V and W;
 wherein said amplification means of said rotor position detection means comprises:
  first amplification means for amplifying a signal derived from line voltage Vw-u output by said first line voltage generation means and outputting a first amplified signal,
  second amplification means for amplifying a signal derived from line voltage Vu-v output by said second line voltage generation means and outputting a second amplified signal, and
  third amplification means for amplifying a signal derived from line voltage Vv-w output by said third line voltage generation means and outputting a third amplified signal;
 wherein said comparison means of said rotor position detection means comprises:
  first comparison means for comparing the signal derived from said line voltage Vw-u with the second amplified signal output by said second amplification means, and outputting a first comparison signal,
  second comparison means for comparing the signal derived from said line voltage Vu-v with the third amplified signal output by said third amplification means, and outputting a second comparison signal, and
  third comparison means for comparing the signal derived from said line voltage Vv-w with the first amplified signal output by said first amplification means, and outputting a third comparison signal;
 wherein the position signal generated by said rotor position detection means includes the first, second and third comparison signals.

11. The brushless DC motor drive apparatus of claim 10 wherein a phase angle of a current flowing through said armature windings relative to a q axis in a d-q coordinate system is defined as current phase angle θ, and said rotor position detection means detects a predetermined magnetic pole position of said rotor when said current phase angle θ has advanced by an electrical angle of not less than 30°.

12. The brushless DC motor drive apparatus of claim 10 wherein said first comparison means outputs a high-level signal when the signal derived from said line voltage Vw-u is larger than the second amplified signal output by said second amplification means, said second comparison means outputs a high-level signal when the signal derived from said line voltage Vu-v is larger than the third amplified signal output by said third amplification means, and said third comparison means outputs a high-level signal when the signal derived from said line voltage Vv-w is larger than the first amplified signal output by said first amplification means.

13. The brushless DC motor drive apparatus of claim 10, further comprising:
 first, second, and third gain switching means for switching a gain of said first, second, and third amplification means respectively into two stages;
 wherein said rotor position detection means includes application voltage determination means for detecting a voltage applied to said motor.

14. The brushless DC motor drive apparatus of claim 13 wherein said application voltage determination means includes hysteresis means for changing an operation timing of said first, second, and third gain switching means according to specified criteria depending on rise and fall of the voltage applied to said motor.

15. The brushless DC motor drive apparatus of claim 10 wherein said rotor position detection means includes n application voltage determination means for detecting a voltage applied to said motor, n being an integer of at least 2;
 the brushless DC motor drive apparatus further comprising:

n gain switching means for changing a gain of said first, second, and third amplification means based on signals generated from associated application voltage determination means.

16. The brushless DC motor drive apparatus of claim 10 wherein said drive control means further includes:

chop-on detection means for detecting the comparison signals from said comparison means of said rotor position detection means synchronously with a chop-on timing of the PWM chopper control signal from said PWM chopper control means and generating data signals;

open phase selection means for selecting an open phase signal from among the data signals output by said chop-on detection means during an open phase; and edge-detection means for detecting predetermined edges of the open phase signal output by said open phase selection means.

17. The brushless DC motor drive apparatus of claim 16 wherein said drive control means further includes:

commutation control means for supplying a commutation signal after said rotor position detection means detects a predetermined magnetic pole position of said rotor and said rotor rotates by a predetermined phase shift, and shift setting means for setting said phase shift.

18. The brushless DC motor drive apparatus of claim 10 wherein said drive control means further includes commutation control means for supplying a commutation signal synchronously with detection of a predetermined magnetic pole position of said rotor by said rotor position detection means.

19. The brushless DC motor drive apparatus of claim 10 wherein said drive control means further includes commutation control means for supplying a commutation signal after said rotor position detection means detects a predetermined magnetic pole position of said rotor and said rotor rotates by a predetermined phase shift.

20. The brushless DC motor drive apparatus of claim 19 wherein said drive control means further includes shift setting means for setting said phase shift.

21. The brushless DC motor drive apparatus of claim 20 wherein said shift setting means sets said phase shift according to at least a rotation count of said rotor.

22. The brushless DC motor drive apparatus of claim 20 wherein said shift setting means sets said phase shift according to a rotation count of said rotor and a motor current.

23. The brushless DC motor drive apparatus of claim 10 wherein said rotor exhibits reverse saliency.

24. The brushless DC motor drive apparatus of claim 23 wherein said rotor includes a yoke having slots formed therein at positions corresponding to magnetic poles, and said permanent magnets are inserted in the slots so that said permanent magnets are not exposed to an exterior perimeter of said rotor.

* * * * *